US012345083B2

(12) United States Patent
Mitchell

(10) Patent No.: US 12,345,083 B2
(45) **Date of Patent: *Jul. 1, 2025**

(54) CONTINUOUS LOCKING HINGE ASSEMBLIES AND FOLDING DOOR ASSEMBLIES INCLUDING THE SAME

(71) Applicant: Endura Products, LLC, Colfax, NC (US)

(72) Inventor: Michael K. Mitchell, Winston-Salem, NC (US)

(73) Assignee: Endura Products, LLC, Colfax, NC (US)

(*) Notice: Subject to any disclaimer, the term of this patent is extended or adjusted under 35 U.S.C. 154(b) by 45 days.

This patent is subject to a terminal disclaimer.

(21) Appl. No.: 17/976,984

(22) Filed: Oct. 31, 2022

(65) Prior Publication Data

US 2023/0046401 A1 Feb. 16, 2023

Related U.S. Application Data

(63) Continuation of application No. 16/890,016, filed on Jun. 2, 2020, now Pat. No. 11,486,177.

(Continued)

(51) Int. Cl.

*E05D 7/00* (2006.01)
*E05D 15/26* (2006.01)
*E05D 7/10* (2006.01)

(52) U.S. Cl.

CPC ............. *E05D 7/009* (2013.01); *E05D 15/26* (2013.01); *E05D 7/1061* (2013.01); *E05D 2007/1094* (2013.01); *E05D 2700/12* (2013.01)

(58) Field of Classification Search

CPC ......... E05D 11/0054; E05D 2011/0063; E05D 2011/0072; E05D 3/122; E05D 1/00;

(Continued)

(56) References Cited

U.S. PATENT DOCUMENTS 947,168 A * 1/1910 Trimmer ............... E05D 7/0423 16/245
1,668,839 A * 5/1928 Cureton .................. F16C 17/08 384/243

(Continued)

FOREIGN PATENT DOCUMENTS

KR 20160015907 A 2/2016
KR 101875113 B1 8/2018

OTHER PUBLICATIONS

Brio Weatherfold, http://briousa.com/wp-content/uploads/sites/3/2016/08/Brio-Weatherfold-4s-Brochure.pdf, known at least as early as Jun. 29, 2018, 36 pgs.

(Continued)

*Primary Examiner* — Chuck Y Mah
(74) *Attorney, Agent, or Firm* — IceMiller LLP

(57) ABSTRACT

A continuous hinge includes first and second leaves, an upper pivot, and a lower pivot. The first leaf is configured to secure to a first panel and the second leaf is configured to secure to a second panel. The first and second leaves each have an uppermost end adjacent a top end of the respective panel and a lowermost end adjacent a bottom end of the respective panel. The upper pivot is formed between the first and second leaves adjacent the uppermost ends thereof. The lower pivot is formed between the first and second leaves adjacent the lowermost ends thereof. The first and second leaves are configured to pivot relative to one another between a closed position in which the first and second panels are aligned on edges with one another and an open position in which the first and second panels are out of alignment with one another.

20 Claims, 23 Drawing Sheets

Related U.S. Application Data

(60) Provisional application No. 62/857,882, filed on Jun. 6, 2019.

(58) Field of Classification Search
CPC ......... E05D 5/06; E05D 7/009; E05D 7/1061; E05D 7/0423; E05D 15/26; E05D 15/262; E05D 15/264; E05D 15/266; E05D 3/02; E05D 2007/1094; E05D 2015/268; E05D 2700/12; E05D 2007/0461; E05Y 2900/132; E05Y 2900/502; E05Y 2600/46; E05Y 2600/41; E05Y 2600/632; E05Y 2201/484; E05Y 2201/496; E05Y 2201/10; E05Y 2201/11; E05F 1/1215; B64C 1/1461
See application file for complete search history.

(56) References Cited

U.S. PATENT DOCUMENTS 1,782,490 A * 11/1930 Torgerson ............ E05D 7/0423 16/245
2,541,567 A * 2/1951 Barrett .................. E05D 7/0045 16/245
2,557,716 A 6/1951 Allee
2,790,198 A 4/1957 Schoen
3,111,208 A * 11/1963 Grossman ................ A47K 3/30 4/607
3,152,355 A * 10/1964 Ferguson ............. E05D 7/0423 160/199
3,210,798 A * 10/1965 Tice ...................... E05D 7/0045 16/245
3,484,895 A 12/1969 Mock
3,584,332 A * 6/1971 Taylor ................... E05D 15/266 16/245
3,696,463 A 10/1972 Watson
3,703,742 A 11/1972 Konishi
3,720,255 A 3/1973 Ueda
3,828,394 A * 8/1974 Horgan, Jr. ........... E05D 5/0246 16/241
3,907,021 A 9/1975 Smith
4,237,577 A 12/1980 Chapel
4,387,760 A 6/1983 Greschbach
4,543,687 A 10/1985 Law
4,922,987 A 5/1990 Marontate
4,953,611 A * 9/1990 Verstraten ............... E05D 15/26 16/370
4,999,876 A * 3/1991 Nass ......................... E05D 7/04 16/236
5,150,501 A 9/1992 Pasternak
5,375,296 A 12/1994 Zaleskie
5,483,770 A * 1/1996 Marinoni ............. E05D 7/0423 16/229
5,694,665 A * 12/1997 Strickland ............ E05D 7/0423 16/237
5,742,980 A 4/1998 Nitta
5,941,027 A 8/1999 Hallsten
6,276,025 B1 * 8/2001 Leibman ................... E05D 5/06 16/241
6,336,249 B1 * 1/2002 Plumley .................. E05D 7/009 16/225
6,516,494 B2 * 2/2003 Nakamoto ............ E05D 7/0027 16/241
6,618,900 B2 9/2003 Spork
6,719,363 B2 4/2004 Erlandsson
6,928,713 B2 8/2005 Baer
6,938,665 B2 9/2005 Lewis, Jr.
7,246,412 B2 7/2007 Pacholke
7,735,882 B2 6/2010 Abdollahzadeh et al.
7,895,713 B2 * 3/2011 Williams, Jr. ............ E05D 5/06 16/389
8,677,564 B2 3/2014 Pelekanos
8,695,165 B2 4/2014 Pelekanos
8,739,367 B2 * 6/2014 Park .......................... E05D 5/06 16/245
8,844,604 B2 9/2014 Pelekanos et al.
9,032,589 B2 5/2015 Pelekanos
9,157,265 B2 10/2015 Pelekanos
9,157,267 B2 10/2015 Pelekanos
9,169,682 B2 10/2015 Reynard
9,428,259 B2 8/2016 Savian
9,605,457 B2 * 3/2017 Humble .................... E05D 7/04
9,976,329 B1 5/2018 Lucci et al.
10,125,527 B2 11/2018 Smalls
10,683,688 B2 * 6/2020 Nußbaum ............... E06B 3/481
10,745,962 B2 8/2020 Mitchell
11,486,177 B2 11/2022 Mitchell
2001/0011583 A1 8/2001 Spork
2003/0024072 A1 * 2/2003 Nussbaum ................ E05D 7/04 16/235
2005/0120517 A1 * 6/2005 Bonham ................... E05D 3/10 16/238
2007/0094846 A1 5/2007 Ishida
2008/0276418 A1 11/2008 Peters
2009/0152879 A1 6/2009 Pala
2010/0012280 A1 1/2010 Hans
2011/0005691 A1 1/2011 Schneider
2011/0099754 A1 * 5/2011 Stull ......................... E05D 5/06 16/245
2013/0186038 A1 * 7/2013 Lang ....................... E06B 3/481 160/199
2016/0024826 A1 1/2016 Smith
2016/0047151 A1 * 2/2016 Pelekanos ........... E05D 11/0054 16/237
2016/0194068 A1 7/2016 Savian et al.
2016/0201369 A1 * 7/2016 Criddle ................. E05D 7/0045 16/238
2016/0215544 A1 * 7/2016 Smalls .................. E05D 5/0223
2016/0237729 A1 * 8/2016 Kohlweiss ................ E05D 3/02
2016/0327085 A1 * 11/2016 Carrera Gonzalez ... F16C 11/04
2017/0198507 A1 * 7/2017 Humble .................... E05D 7/04
2019/0078367 A1 3/2019 Xiao
2019/0136607 A1 5/2019 Lewis
2021/0262259 A1 * 8/2021 Duer ..................... E05D 7/0018

OTHER PUBLICATIONS

Brio Dual Point Lock, http://briousa.com/wp-content/uploads/sites/3/2016/08/Brio-286-Dual-Point-Lock-Brochure-USA.pdf, known at least as early as Jun. 29, 2018, 20 pgs.
Brio Flush Bolt Range, http://briousa.com/wp-content/uploads/sites/3/2017/11/Brio-Flush-Bolt-Range-Brochure.pdf, known at least as early as Jun. 29, 2018, 16 pgs.
Kolbe Windows and Doors, https://www.kolbewindows.com/doors/vistaluxe-folding, known at least as early as Jun. 29, 2018, 4 pgs.
Marvin Windows and Doors, https://www.marvin.com/WebDoc/Marvin%20ADM%20CMOBFD.pdf, known at least as early as Jun. 29, 2018, 7 pgs.
Western Window Systems, https://westernwindowsystems.com/classic-line/series-9500-folding-door-systems/, known at least as early as Jun. 29, 2018, 19 pgs.
Assa Abloy, https://www.assaabloyentrance.us/en/products/automatic-doors/automatic-folding-doors/, known at least as early as Oct. 4, 2021, 3 pgs.
Canadian Office Action Issued in Canadian Application No. 3,081,874 dated Mar. 14, 2024 5 Pages.

* cited by examiner

CONTINUOUS LOCKING HINGE ASSEMBLIES AND FOLDING DOOR ASSEMBLIES INCLUDING THE SAME

CROSS-REFERENCE TO RELATED APPLICATIONS

This application is a continuation of U.S. patent application Ser. No. 16/890,016, filed Jun. 2, 2020, which claims priority to, and benefit from, U.S. Provisional Patent Application Ser. No. 62/857,882, filed Jun. 6, 2019. The entire contents of each of the above applications are hereby incorporated by reference.

FIELD OF DISCLOSURE

The present disclosure relates to folding door assemblies. More particularly, the present disclosure relates to folding door assemblies including a continuous locking hinge assembly including a locking feature and/or an integrated weather seal.

BACKGROUND

Folding door assemblies can provide for large openings between building spaces when open and can prevent liquid intrusion, prevent thermal conduction, and/or provide acoustic isolation when closed. Typically, folding door assemblies include door panels that are connected to each other by multiple, surface-mounted hinges located on edges of each door panel. The end panels may utilize pivot hinges at the top and bottom of their outermost edges and the panels can be supported by roller hardware or bogies attached near the top ends such that the panels hang from and are guided by an overhead rail or track. The panels can be guided at the bottom by roller hardware that rides in a sill or on a floor track. The roller hardware is typically installed in grooves, channels, or mortises that are machined in the top and bottom ends of the panels.

To lock the panels in a closed position, locking hardware can be mounted to the panel edge or face and be driven into the sill. The locking hardware may be flush on the panel or may be installed within an end of a panel requiring machining of the end of the panel.

In the closed position, the gaps or spaces between adjacent panels are sealed by weather seals attached to each panel. To attach the weather seals, each panel is machined to include mounting slots along the edges to receive the weather seals.

SUMMARY

This disclosure relates generally to door panel assemblies having continuous hinge assemblies that include pivots, roller assemblies, weather seals, and/or a locking systems. The hinge assemblies may be secured to the door panels without requiring additional machining of the panels, e.g., grooves, channels, or mortises. The door panel assemblies may include an adjustment mechanism to adjust a gap between adjacent door panels.

In an embodiment of the present disclosure, a continuous hinge assembly includes a first leaf, a second leaf, an upper pivot, and a lower pivot. The first leaf has an uppermost end and a lowermost end and is configured to be secured to an edge of a first panel with the uppermost end disposed adjacent a top end of the first panel and the lowermost end disposed adjacent a bottom end of the first panel. The second leaf has an uppermost end and a lowermost end and is configured to be secured to an edge of a second panel adjacent the edge of the first panel with the uppermost end disposed adjacent a top end of the second panel and the lowermost end disposed adjacent a bottom end of the second panel. The upper pivot is formed between the first leaf and the second leaf and is disposed adjacent the uppermost ends of the first and second leaves. The lower pivot is formed between the first leaf and the second leaf and is disposed adjacent the lowermost ends of the first and second leaves. The upper and lower pivots are coaxially aligned with one another to define a pivot axis between the first and second leaves. The first and second leaves are configured to pivot relative to one another about the pivot axis. The first and second leaves have a closed position in which the first and second panels are aligned on edges with one another to form an extended wall and an open position in which the first and second panel are out of alignment with one another.

In embodiments, the continuous hinge assembly includes a locking assembly having an upper shoot bolt with an upper tip. The locking assembly may have a retracted position in which the upper tip of the upper shoot bolt is disposed at or below the uppermost end of the hinge assembly and an extended position in which the upper tip of the upper shoot bolt extends in a direction parallel to the pivot axis above the uppermost end of the hinge assembly. The upper shoot bolt may be configured to be disposed between the edge of the first panel and the edge of the second panel in the closed position. The locking assembly may include an upper shoot bolt guide secured to the first leaf adjacent the uppermost end thereof. The upper shoot bolt guide may define a pair of finger catches on opposite sides thereof. The first leaf may include a pair of opposed retaining fingers with each of the retaining fingers received within one of the pair of finger catches to secure the upper shoot bolt guide relative to the first leaf.

In some embodiments, the locking assembly includes a lower shoot bolt having a lower tip. In the retracted position of the locking assembly, the lower tip of the lower shoot bolt may be disposed at or above the lowermost end of the hinge assembly and in the extended position of the locking assembly the lower tip of the lower shoot bolt may extend in a direction parallel to the pivot axis below the lowermost end of the hinge assembly. The locking assembly may include a lock lever that is rotatable between a locked position and an unlocked position to transition the shoot bolts between the extended and retracted positions. The upper and lower shoot bolts may be coaxially aligned with one another.

In certain embodiments, the locking assembly includes a latch configured to secure the first and second leaves in the closed position. The latch may include a latch key and have a locked position in which the latch key is configured to extend between the first and second leaves to secure the first and second leaves in the closed position. The locking assembly may include a latch release button configured to retract the latch from the locked position towards an unlocked position in which the first and second leaves are permitted to move from the closed position towards the open position. The latch release button may include a release cam that is operably engaged with the latch. The latch release cam may be configured to operably engage the latch to translate the latch towards the unlocked position as the latch release button is depressed. The latch release button may be configured to move in a direction orthogonal to the latch to translate the latch towards the unlocked position. The latch may be biased towards the locked position. The latch may engage the latch release button to bias the latch release button towards the undepressed position. In the locked position of the lock lever, the lock lever may prevent access to the latch release button.

In particular embodiments, the latch is attached to the first leaf and the second leaf includes a latch strike configured to engage the latch as the first and second leaves approach the closed position to transition the latch from the locked position towards the unlocked position. The latch strike may be configured to permit the latch to return to the locked position when the first and second leaves are in the closed position.

In embodiments, the continuous hinge assembly includes an upper roller assembly that extends from the uppermost surface of the first leaf. The upper roller assembly may include a first roller configured to support the first and second leaves. The first roller may be configured to roll along a track as the first and second leaves transition between the open and closed position. The continuous hinge assembly may include a lower roller assembly that extends from the lowermost surface of the first leaf. The lower roller assembly may include a lower guide roller that is configured to extend into and translate into a channel of a sill as the first and second leaves transition between the open and closed positions. The lower guide roller may define a longitudinal axis coaxial with the pivot axis.

In some embodiments, each of the first and second leaves includes a mounting segment that is configured to be secured and in contact with the edge of the respective first or second panel. Each of the first and second leaves may include an offset segment that is parallel to and laterally offset from the mounting segment. Each of the first and second leaves may include a top plate having a mounting flange secured to the offset segment and configured to be positioned between the offset segment and an edge of the respective one of the first or second panels. Each of the first and second leaves may include an alignment finger that may be configured to extend along a surface of one of the first or second panels to position the respective one of the first or second leaves relative to the one of the first or second panels.

In certain embodiments, the continuous hinge assembly includes a weather strip that is secured to the first leaf or the second leaf and configured to form a seal between the first and second leaves. The seal may be formed from the uppermost ends to the lowermost ends of the first and second leaves in the closed position. The weather strip may be positioned entirely between the first and second leaves in the closed position of the continuous hinge assembly.

In another embodiment of the present disclosure, a door panel system includes first, second, and third panels, a first hinge, and a second hinge. The first, second, and third panels each have a top end and a bottom end. The first hinge pivotally couples the first panel to the second panel and has an uppermost end adjacent the top end of each of the first and second panels and a lowermost end adjacent the bottom end of each of the first and second panels. The second hinge pivotally couples the second panel to the third panel. The door panel system has a closed configuration in which the first, second, and third panels are aligned edge to edge with one another and an open configuration in which the first, second, and third panels are stacked parallel with one another and orthogonal to the closed configuration.

In another embodiment of the present disclosure, a continuous hinge assembly includes a first leaf, a second leaf, and a locking assembly. The first leaf is configured to secure to a first panel and the second leaf is configured to secure to a second panel. The first and second leaves have a closed position in which the first and second leaves are nested with one another and an open position in which the first and second leaves are pivoted apart about a common pivot axis. The locking assembly is configured to prevent the first and second leaves from pivoting from the closed position towards the open position. The locking assembly is disposed between the first leaf and the second leaf when the first and second leaves are nested with one another.

In embodiments, the locking assembly includes a latch having a latch key. The latch may have a locked position in which the latch key is disposed between a first edge of the first leaf and a second edge of the second leaf in the closed position to prevent the first and second leaves from pivoting from the closed position towards the open position. The latch may have an unlocked position in which the latch key is withdrawn from between the first and second edges.

In some embodiments, the locking assembly includes a locking lever that is pivotal between an unlocked position and a locked position. The locking assembly may include an upper shoot bolt and a lower shoot bolt that are each operably coupled to the locking lever such that in the locked position the upper and lower shoot bolts are each in an extended position to prevent pivoting of the first and second leaves from the closed position and in the unlocked position the upper and lower shoot bolts are each in a retracted position in which the first and second leaves are permitted to pivot relative to one another.

In another embodiment of the present disclosure, a continuous hinge assembly includes a first leaf and a second leaf. The first leaf is configured to secure to a first panel and extend along a majority of a hinged edge of the first panel. The second leaf is configured to secure to a second panel and to extend along a majority of a hinged edge of the second panel. The first leaf and the second leaf have a closed position in which the first leaf and the second leaf are nested with one another and an open position in which the first leaf and the second leaf are pivoted apart about a common pivot axis.

In embodiments, the continuous hinge assembly includes a locking assembly that is configured to secure the first leaf and the second leaf from pivoting from the closed position toward the open position. The locking assembly may be disposed within the first leaf and the second leaf when the first leaf and the second leaf are nested within on another. The locking assembly may include a locking lever that is pivotal between an unlocked position and a locked position. An upper shoot bolt and a lower shoot bolt are each operably coupled to the locking lever such that in the locked position the upper and lower shoot bolts are each in an extended position to prevent pivoting of the first and second leaves form the closed position and in the unlocked position, the upper and lower shoot bolts are each in a retracted position in which the first and second leaves are permitted to pivot relative to one another.

In some embodiments, the hinge assembly includes a top pivot assembly that is secured to a top end of the first leaf and a top end of the second leaf. The top pivot assembly may include a first side and a second side. The first side may be secured to the top end of the first leaf and the second side may be secured to the top end of the second leaf. The top pivot assembly may define a pivot axis such that the first leaf and the second leave pivot relative to one another about the pivot axis between the closed position and the open position. The first leaf may define a cavity and the pivot axis may pass through the cavity of the first leaf. The second leaf may define a cavity and the pivot axis may pass through the cavity of the second leaf.

In certain embodiment, the first leaf has a first extraction profile and the second leaf has a second extrusion profile that is different from the first extrusion profile. The hinge assembly may include a weather strip that is secured to the section leaf. The weather strip may be configured to engage the first leaf when in the closed position to form a seal between the first leaf and the second leaf. The first leaf may include a cover that is secured thereto. The cover may be configured to cover fasteners that secure the first leaf to the first panel. The cover may be engaged by the weather strip to form at least a portion of the seal between the first leaf and the second leaf in the closed position.

In particular embodiments, the hinge assembly includes a gap adjustment mechanism that is disposed in the first side of the second side of the top pivot assembly. The gap adjustment mechanism may be configured to adjust a thickness of the top pivot assembly. The gap adjustment mechanism may include a body that is rotatably fixed to the first side of the second side of the top pivot assembly, the body may define a pivot axis and may be configured to receive and rotate about a pivot pion disposed therethrough. The gap adjustment mechanism may include an adjustment screw that extends in a direction orthogonal to the pivot axis such that rotation of the adjustment screw in a first direction increases the thickness of the top pivot and rotation of the adjustment screw in a second direction opposite the first direction decreases a thickness of the top pivot.

In another embodiment of the present disclosure, surface mounted hardware for a folding door assembly includes a first leaf and a second leaf. The first leaf is configured to secure to an unmachined hinged edge of a first panel of a fooling door assembly and the second leaf is configured to secured to an unmachined hinged edge of a second panel of the folding door assembly. The first leaf and the second leaf having a closed position in which the first and second leaves are configured to support the first and second panels in a parallel planar relation within one another and an open position in which the first and second leaves are configured to support the first and second panels in a stacked relationship with one another.

Further, to the extent consistent, any of the aspects described herein may be used in conjunction with any or all of the other aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
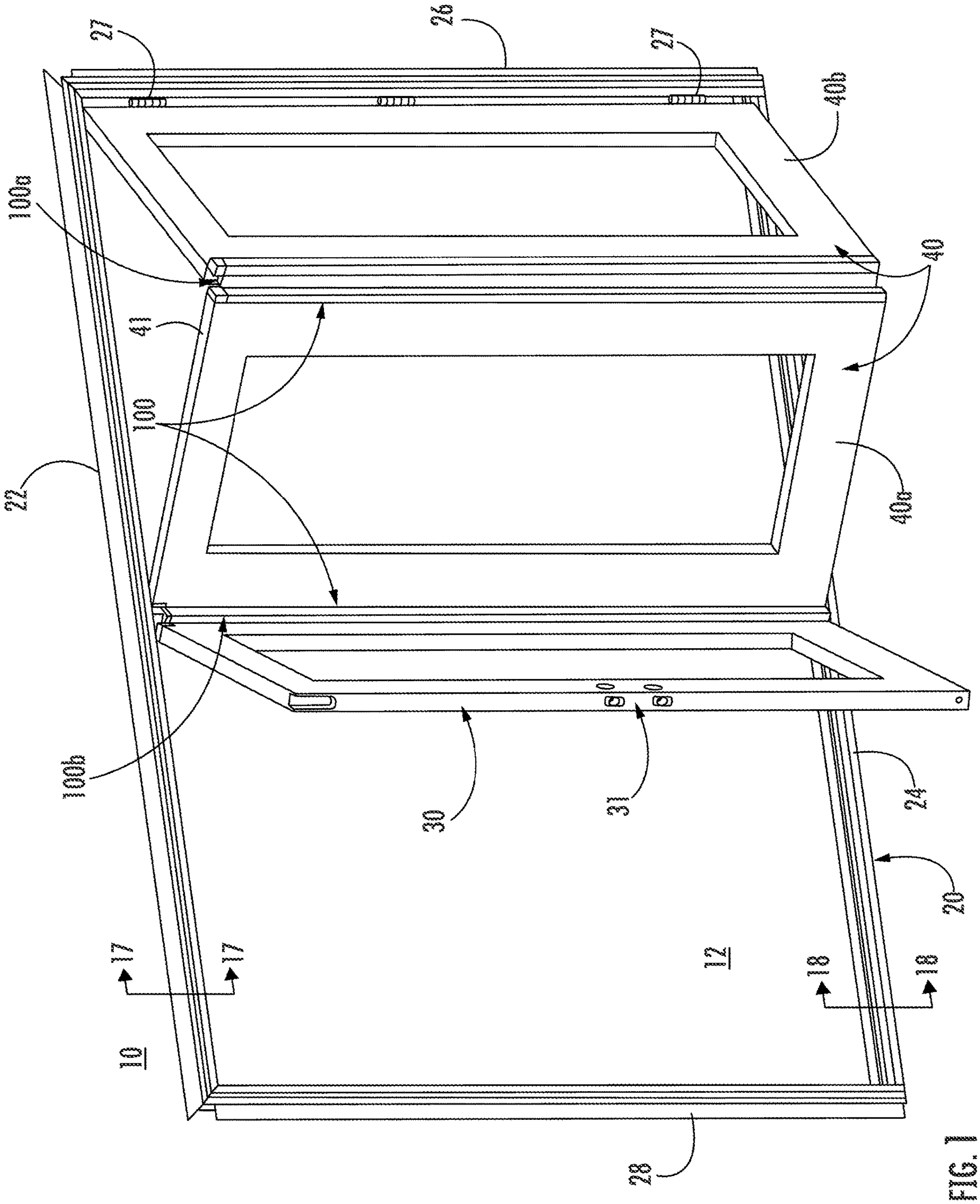
FIG. 1 is a perspective view of an exemplary door panel system provided in accordance with the present disclosure in an open configuration.

Embodiments of the present disclosure are now described in detail with reference to the drawings in which like reference numerals designate identical or corresponding elements in each of the several views. As used herein, the term "interior" refers a side of an opening or surface that faces a space to be isolated or enclosed by a door or moveable wall and may include, but is not limited to, an interior space, a meeting room, or a portion of a larger gathering space. In addition, as used herein, the term "exterior" refers to a side of the opening or surface that faces an external environment to the space to be isolated or enclosed by the door or moveable wall and may include, but is not limited to, an exterior to a building, a lobby, a gathering space, or a performance space.

Figure 2:
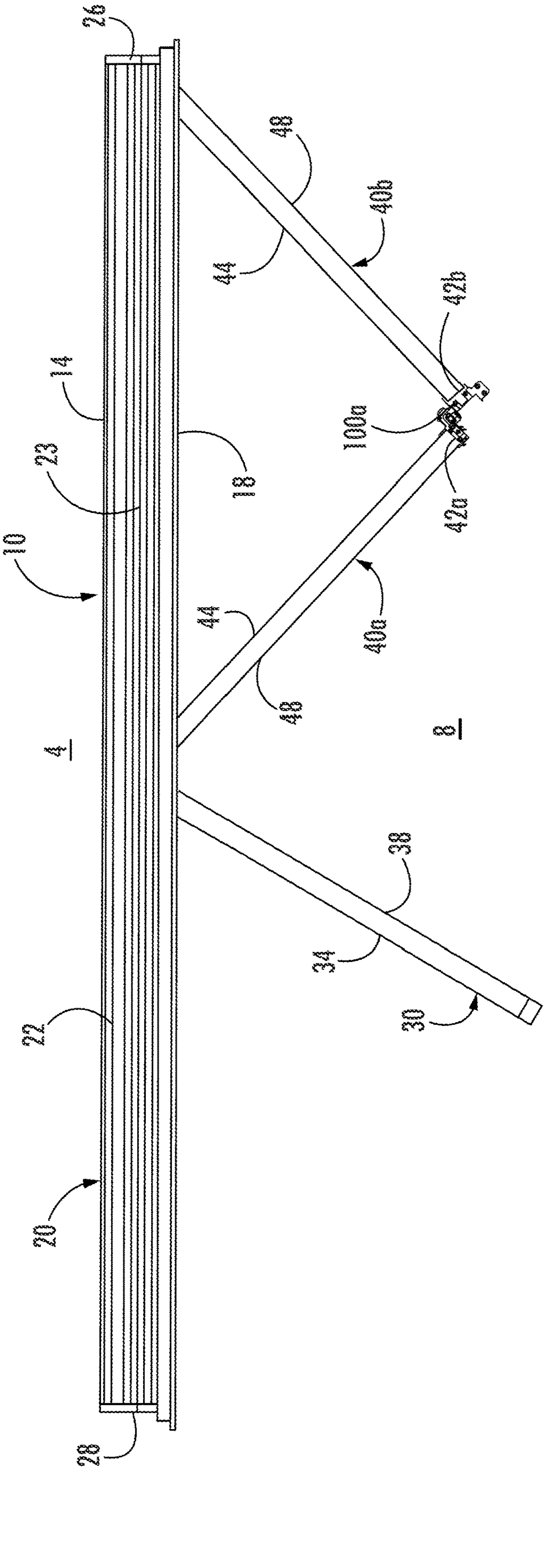
FIG. 2 is a top view of the door panel system of FIG. 1.

Referring now to FIGS. 1 and 2, an exemplary door panel system is provided in accordance with the present disclosure and referred to generally as door panel system 10. The door panel system 10 includes a frame 20, an operating panel 30, secondary panels 40, and continuous hinges 100. The door panel system 10 is configured to selectively separate an interior space 4 from an exterior space 8 with an interior side 14 configured to face the interior space 4 and an external side 18 configured to face the exterior space 8.

The frame 20 defines an opening 12 between the interior space and the exterior space and includes a top guide rail 22, a bottom sill 24, a fixed jamb 26, and an operating jamb 28 that surround the opening 12. The guide rail 22 forms a top edge of the opening 12. The sill 24 opposes the guide rail 22 to form a bottom edge of the opening 12. The fixed jamb 26 interconnects the guide rail 22 and the sill 24 and forms a side edge of opening 12. The operating jamb 28 interconnects the guide rail 22 and the sill 24, opposes the fixed jamb 26, and forms a side edge of the opening 12.

As shown, the door panel system 10 includes one operating panel 30 and two secondary panels 40. The door panel system 10 has a closed position (FIG. 19) in which the operating panel 30 and each of the secondary panels 40 are aligned such that interior and exterior surfaces of each panel 30, 40 are substantially coplanar with one another, this may be referred to as a parallel planar relationship. In embodiments, the door panel system 10 may include one operating panel 30 and a plurality of secondary panels 40. The number of secondary panels 40 is only limited by the size of the opening 12. In particular embodiments, the door panel system 10 only includes secondary panels 40. The operating panel 30 and each of the secondary panels 40 may have similar widths, with the width of each panel 30, 40 being defined in the closed position as a distance along the top guide rail 22. In embodiments, the operating panel 30 has a first width and each of the secondary panels 40 has a second width larger than the first width. In the closed position, the operating panel 30 and the secondary panels 40 form a barrier between the interior side 14 and the exterior side 18 of the door panel system 10 to close the opening 12. In the closed position, the operating panel 30 and the secondary panels 40 may substantially seal the opening 12 to prevent penetration of water and air through the opening 12. In some embodiments, in the closed position, the operating panel 30 and the secondary panels 40 may form an acoustic barrier between the interior and exterior sides 14, 18 of the door panel system 10.

With continued reference to FIGS. 1 and 2, the door panel system 10 is in an open position in which at least one of the operating panel 30 or one of the secondary panels 40 are out of alignment with another one of the panels 30, 40. In open positions, passage through the opening 12 between the interior side 14 and the exterior side 18 of the door panel system 10 may be permitted. To transition between the closed position and the open position, the operating panel 30 and/or the secondary panels 40 pivot relative to one another about continuous hinges 100. As detailed below, the operating panel 30 may transition to an open position with each of the secondary panels 40 remaining in the closed position. In a fully open position (FIG. 22), the panels 30, 40 are stacked with one another adjacent the fixed jamb 26 of the frame 20 with interior surfaces 34, 44 or exterior surfaces 38, 48 of adjacent panels 30, 40 parallel and in opposition to one another. In the fully open position, the interior surfaces 34, 44 or the exterior surfaces 38, 48 of adjacent panels 30, 40 may be in contact with one another.

Referring briefly back to FIG. 1, the continuous hinge 100 may be assembled as a locking hinge, e.g., hinge 100*a*, or as a sliding hinge, e.g., hinge 100*b*. The continuous hinge 100 is versatile allowing the same hinge 100 to be assembled as a locking or sliding hinge based on the position within the door panel system 10. In addition, the door panels, e.g., panels 30, 40, do not require machining to receive the continuous hinge 100 in either the locking or sliding hinge configuration. As detailed below, a number of unique components of the continuous hinge 100 have been duplicated to reduce inventory requirements for assembling the continuous hinge 100 in a variety of configurations. For example, the continuous hinge 100*a* between the secondary panels 40 is configured as a locking hinge 100*a* with a pivot assembly and a locking assembly 300 being added to the continuous hinge 100. In contrast, the continuous hinge 100*b* between the operating panel 30 and the secondary panel 40 is configured as a sliding hinge 100*b* with a top guide roller or bogie assembly 400 and a lower guide assembly 450 being added to the continuous hinge 100. The flexibility of the continuous hinge 100 may allow for a reduction in inventory parts and simplified assembly. A reduction in inventory parts and simplified assembly may reduce costs associated with manufacturing, construction, and/or maintenance of a door panel system using the continuous hinges 100.

Figure 3:
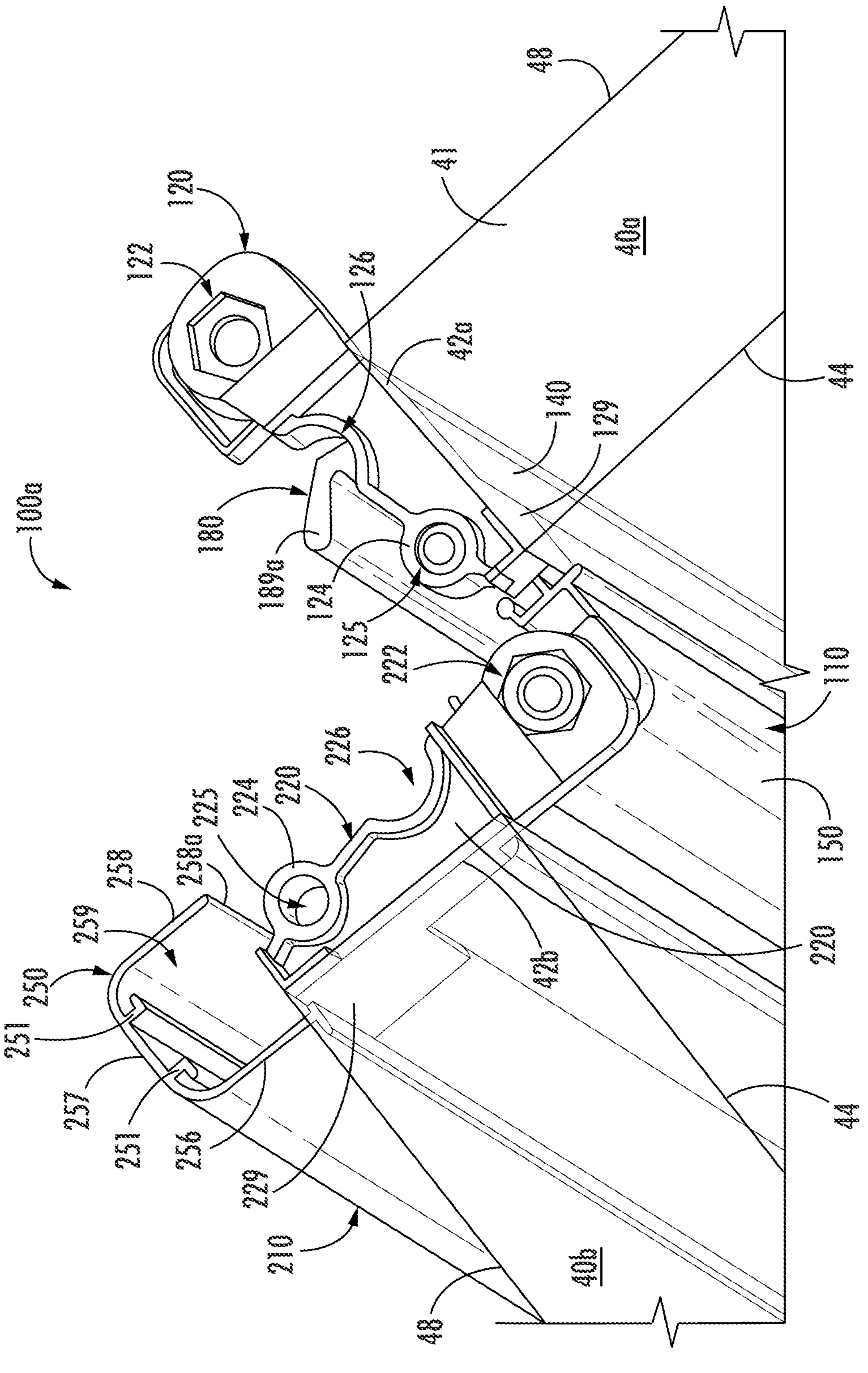
FIG. 3 is an enlarged perspective view of a portion of a locking hinge of the door panel system of FIG. 1.
Figure 4:
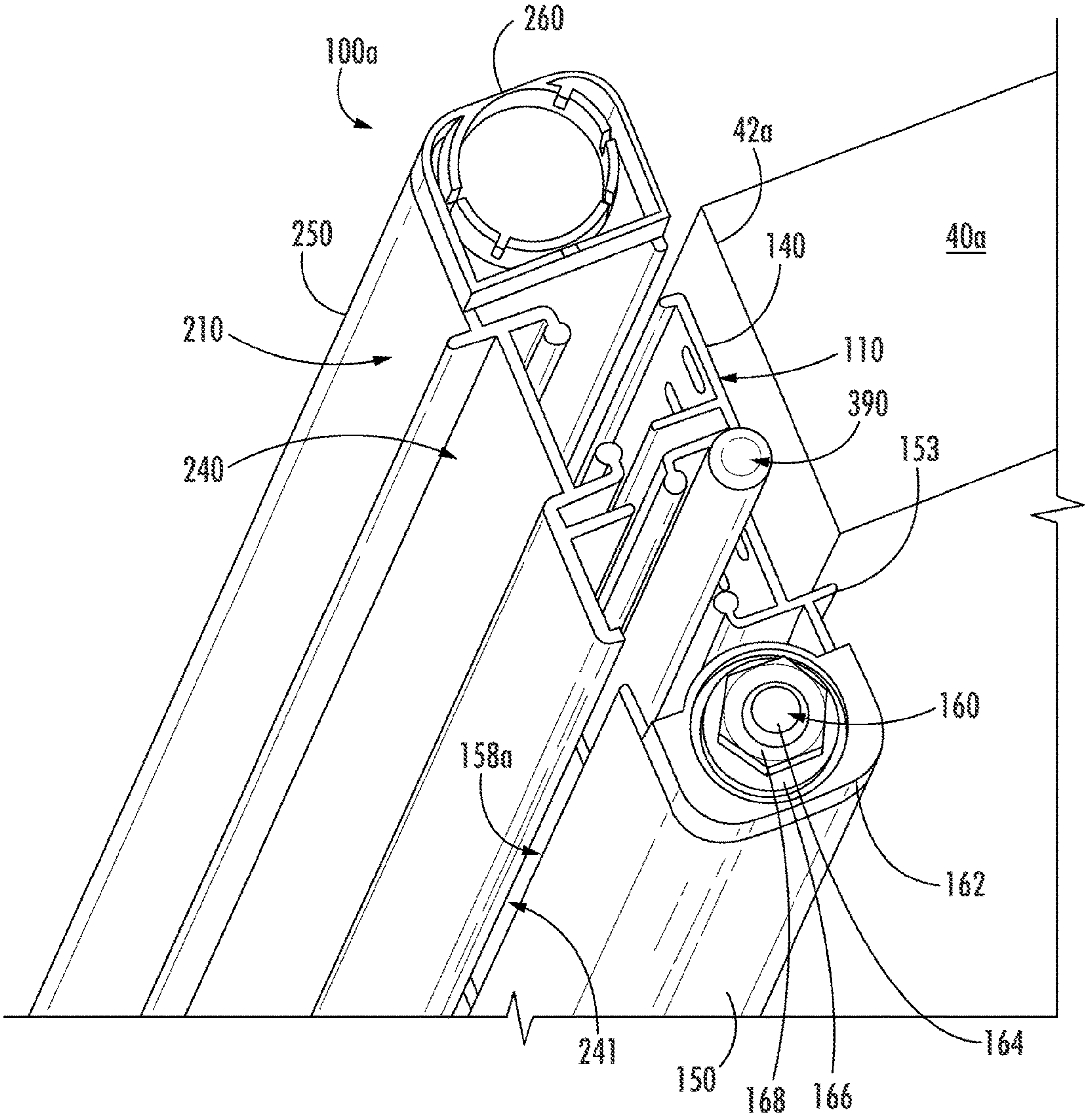
FIG. 4 is an enlarged perspective view of the portion of the locking hinge of the door panel system of FIG. 3 in a closed position with elements of the locking hinge removed to illustrate internal components thereof.
Figure 5:
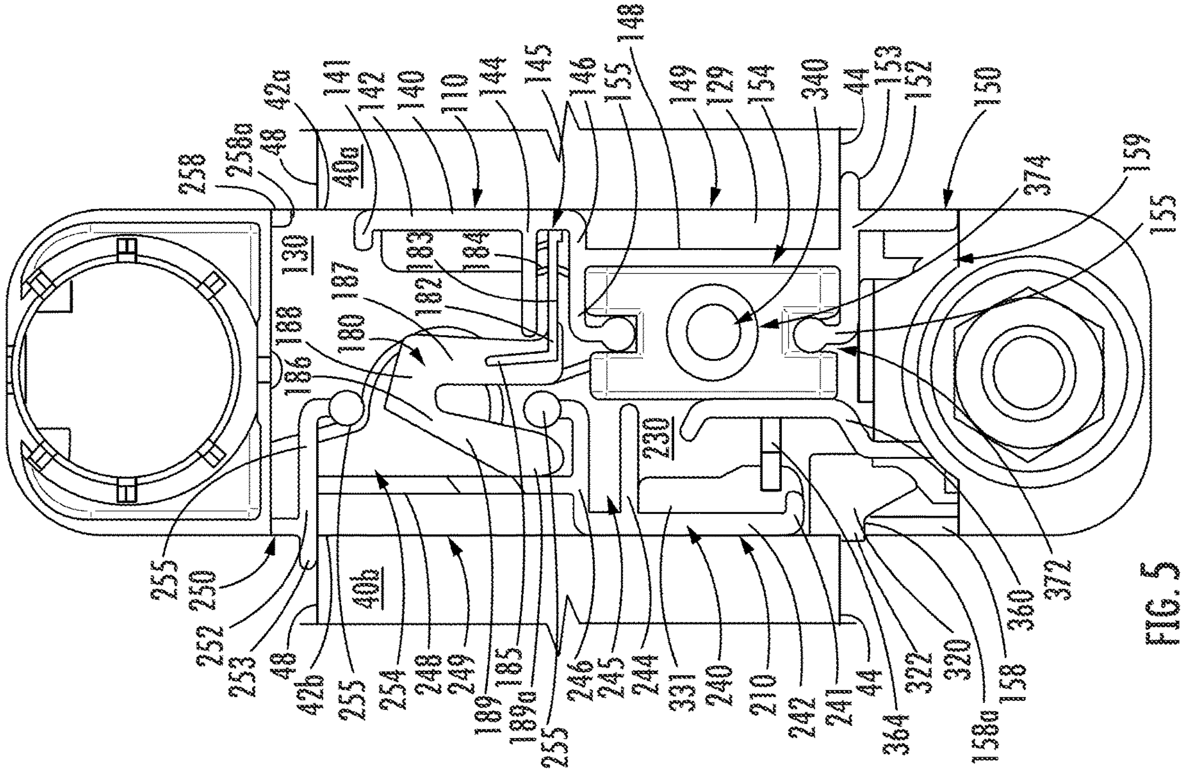
FIG. 5 is a top view of the locking hinge of FIG. 3 in the closed position with a top end plates removed to show internal components of the locking hinge.

Referring to FIGS. 3-5, the continuous hinge 100*a* is secured between adjacent panels 40 to support the panels 40 and facilitate movement between the fully open and closed positions. The continuous hinge 100*a* extends continuously along a majority of a height of the panels 40 with an uppermost end of the continuous hinge 100*a* adjacent a top surface of the panels 40 and a lowermost end of the continuous hinge 100*b* adjacent a bottom end of the panels 40. As noted above, the continuous hinge 100*a* is a locking hinge; however, it is contemplated that a sliding hinge may also be used between adjacent secondary panels 40 based on a position within a door panel assembly 10. The continuous hinge 100 includes a first leaf 110 secured to a side edge 42*a* that extends between in interior surface 44 and the exterior surface 48 of one panel, e.g., secondary panel 40*a*, and a second leaf 210 secured to a side edge 42*b* of an adjacent panel, e.g., another secondary panel 40*b*. As described in greater detail below, the first and second leaves 110, 210 are pivotally coupled to one another to form the continuous hinge 100. The second leaf 210 is similar to the first leaf 110 and is rotated 180 degrees about a central longitudinal axis of the continuous hinge 100*a* with like elements represented with a similar label with a leading "2" replacing the leading "1" of the similar element of the first leaf 110. As such, the first leaf 110 will be described in detail with only differences in structure and assembly of the second leaf 210 detailed herein for reasons of clarity and brevity.

The first leaf 110 may be formed as an extrusion and cut to a desired length and includes an edge plate 140 and a shell 150. The edge plate 140 has a mounting segment 142 and an offset segment 148 that are substantially parallel to one another and offset from one another. The mounting segment 142 is secured directly to the side edge 42*a* of the secondary panel 40*a* with a locking edge 141 of the mounting segment 142 positioned adjacent a surface, e.g., exterior surface 48, of the secondary panel 40*a*. The mounting segment 142 may be secured to the side edge 42*a* with one or more fasteners passing through the mounting segment 142 and into the secondary panel 40*a*. The one or more fasteners may be screws, nails, bolts, or any other suitable fastener. In some embodiments, the mounting segment 142 is at least partially adhered to the side edge 42*a* by an adhesive. When the mounting segment 142 is secured to the side edge 42*a*, the offset segment 148 defines a gap 149 between the offset segment 148 and the side edge 42. With particular reference to FIG. 3, a mounting flange 129 of a top plate 120 may be positioned within the gap 149 to secure the top plate 120 to the first leaf 110 and/or to form a seal between the edge plate 140 and the side edge 42*a*. The offset segment 148 may be secured to the side edge 42 with one or more fasteners passing through the offset segment 148 and the mounting flange 129 and into the secondary panel 40*a*. Additionally or alternatively, the mounting flange 129 may be adhered to the offset segment 148 and/or the side edge 42*a* with an adhesive.

The edge plate 140 also includes a transverse segment 146 that interconnects the mounting segment 142 and the offset segment 148. The transverse segment 146 extends from a side of the mounting segment 142 opposite a side secured to the side edge 42*a* of the secondary panel 40*a*. The transverse segment 146 may terminate at the offset segment 148 or may extend beyond the offset segment 148. The transverse segment 146 may be oriented substantially orthogonal to the mounting segment 142 and the offset segment 148. The edge plate 140 may include a seal segment 144 that extends from the side of the mounting segment 142 opposite the side secured to the side edge 42*a* of the secondary panel 40*a* and may be parallel to the transverse segment 146. The seal segment 144 may extend a distance substantially equal to a distance the transverse segment 146 extends form the mounting segment 142 or may extend a lesser or a greater distance than the transverse segment 146 from the mounting segment 142. The seal segment 144 and the transverse segment 146 define a seal channel 145 therebetween. The seal channel 145 may receive a portion of a weather strip 180 as detailed below.

The shell 150 of the first leaf 110 includes an edge wall 152 that connects with the offset segment 148 of the edge plate 140. Specifically, the offset segment 148 terminates opposite the transverse segment 146 at an edge wall 152. The edge wall 152 is substantially parallel to the transverse segment 146 and orthogonal to the offset segment 148. The edge wall 152 includes an alignment finger 153 that is configured to extend beyond the side edge 42*a* of the secondary panel 40*a* and along a surface of the secondary panel 40, e.g., the interior surface 44, to align or position the first leaf 110 relative to the secondary panel 40*a*. The edge wall 152 and the transverse segment 146 may each extend beyond the offset segment 148 in a direction away from the side edge 42*a* to define a hollow 154 therebetween. The edge wall 152 and the transverse segment 146 may each include retaining fingers 155 that extend into the hollow 154 in opposition to one another. The hollow 154 may be configured to receive a shoot bolt assembly 340 that is retained within the hollow 154 by the retaining finger 155 as described in greater detail below.

The structure of a portion of the shell 150 of the first leaf 110 is obscured in FIGS. 3-5. For this reason, the structure of the shell 150 of the first leaf 110 will be described with reference to the shell 250 of the second leaf 210 that is best shown in FIG. 3. The shell 250 includes a first wall 256, a second wall 257, and a third wall 258 which define a cavity 259 having a substantially rectangular cross-section. The first wall 256 extends in a direction substantially orthogonal to the edge wall in a direction away from the edge plate 240. The second wall 257 has a first end connected to the first wall 256 and extends in a direction orthogonal to the first wall 256 and substantially parallel to the edge wall 252 to a second end connected to the third wall 258. The third wall 258 is substantially parallel to the first wall 256 and orthogonal to the second wall 257 and the edge wall 252. The third wall 258 is spaced apart from the edge wall 252 such that a gap is defined therebetween. The third wall 258 terminates at a shell edge 258*a* that opposes the locking edge 141 of the first leaf 110 when the continuous hinge 100*a* is in the closed position as shown in FIG. 5. The shell 250 may also include a pivot finger 251 or a pair of pivot fingers 251 that extend into the cavity 259 from the second wall 257 toward the edge wall 252. The pivot finger(s) 251 may be configured to secure and/or align one or more components received within the cavity 259 relative to the shell 250.

With particular reference to FIG. 5, the continuous hinge 100 may include a weather strip 180 that is configured to form a seal within the continuous hinge 100 between the interior space and the exterior space when the continuous hinge 100 is in a closed position. Specifically, the weather strip 180 includes a rigid insert 182 and a flexible member 186. The rigid insert 182 includes a retention portion 183 that is received within the seal channel 145 of the first leaf 120 to secure the weather strip 180 within the continuous hinge 100. The retention portion 183 may include a plurality of arms 184 that extend outward to engage walls defining the seal channel 145, e.g., seal segment 144 and/or transverse segment 146. The rigid insert 182 also includes a seal tab 185 that extends into the flexible member 186. The rigid insert 182 may be formed of a rigid material including, but not limited to, a thermoset plastic, a metal, or a metal alloy. In embodiments, the rigid insert 182 may be formed of a flexible material such as natural or synthetic rubber or a rubberized material.

The flexible member 186 is secured to the seal tab 185 to support the flexible member 186 relative to the first leaf 110. The flexible member 186 may be formed around the seal tab 185, may be integrally formed with the seal tab 185, or may be bonded to the seal tab 185. In some embodiments, the flexible member 186 and the rigid insert 182 are monolithically formed with one another. The flexible member 186 has a substantially U or V shaped cross-section with a first arm 187 secured to the seal tab 185 and a second arm 189 configured to abut an offset plate 248 of second leaf 210 when the continuous hinge 100 is in the closed position. The first and second arms 187, 189 are connected by a bridge 188. The bridge 188 may bias the second arm 189 away from the first arm 187 such that when the second arm 189 engages the offset plate 248, the bridge 188 urges the second arm 189 towards the offset plate 248 to form a seal between the second arm 189 and the offset plate 248. In particular embodiments, a tip 189*a* of the second arm 189 may be captured between the offset plate 248 and a retention finger 255 of the second leaf 210 to enhance a seal between the first leaf 110 and the second leaf 210. The seal between the second arm 189 and the offset plate 248 may be water and/or air tight. The weather strip 180 may be selected based on the external space. For example, the weather strip 180 may be selected to provide a seal against one or more of the following elements snow, ice, wind, extreme wind (hurricane), and/or in extreme cold and/or extreme heat conditions.

Figure 6:
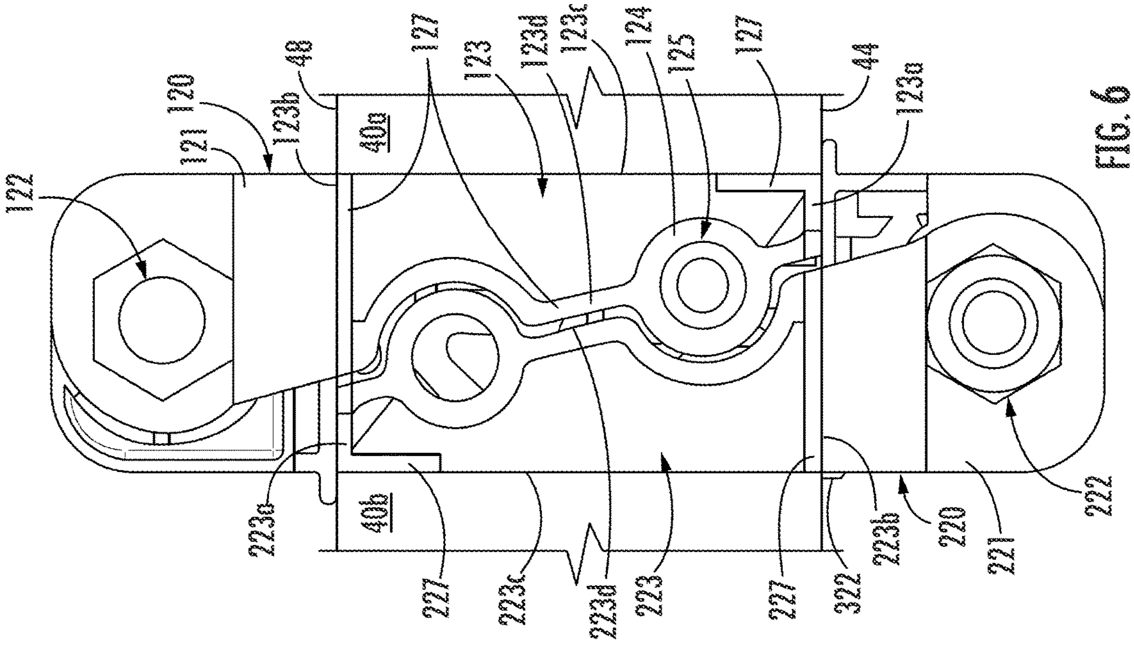
FIG. 6 is a top view of the locking hinge of FIG. 5 including the top end plates.

With additional reference to FIG. 6, the continuous hinge 100 includes the top plate 120 and a bottom plate 130 (FIG. 5) associated with the first leaf 110 and a top plate 220 and a bottom plate 230 (FIG. 5) associated with the second leaf 210. The top plates 120, 220 are secured to an uppermost end of the first or second leaf 110, 210, respectively, and the bottom plates 130, 230 are secured to a lowermost end of the first or second leaf 110, 210, respectively. Each of the top and bottom plates 120, 130, 220, 230 has similar features to one another and may be referred to collectively as end plates. Specifically, the top plates 120, 220 are rotated 180 degrees relative to one another about the central longitudinal axis of the continuous hinge 100 and the bottom plates 130, 230 are rotated 180 degrees relative to one another about the central longitudinal axis of the continuous hinge 100. A significant structural difference between the top and bottom plates 120, 130, 220, 230 is the face which the mounting flange of the respective plate, e.g., mounting flange 129, with the mounting flange extending from a bottom surface of the top plates 120, 220 and extending from a top surface of the bottom plates 130, 230. As such, only the features of the top plate 120 will be detailed herein for reasons of brevity with similar features labeled in a similar manner for the top plate 220 and the bottom plates 130, 230.

The top plate 120 has a substantially planar body 123 that is configured to cap, cover, or seal a portion of a top end of the first leaf 110. As noted above, the top plate 120 includes a mounting flange 129 (FIG. 5) that extends orthogonally from the body 123 adjacent a first end 123*a* of the body 123 and is captured within the gap 149 (FIG. 5) between the edge plate 140 and the edge 42*a* of the secondary panel 40*a*. The body 123 is sized and dimensioned to extend between the interior and exterior surfaces 44, 48 of the secondary panel 40*a* and to sit adjacent a top end 41 of the secondary panel 40*a*. As shown in the FIG. 3, the body 123 is positioned just below the top end 41 of the secondary panel 40*a* and may include one or more ridges 127 that extend to a plane co-planer with the top end 41. In embodiments, the body 123 is spaced apart a distance from the top end 41 of the panel 40*a*. The body 123 has a side edge 123*c* that extends between the first and second ends 123*a*, 123*b* and is configured to abut the side edge 42*a* of the secondary panel 40*a*. The body 123 also includes an oblique edge 123*d* that extends between the first and second ends 123*a*, 123*b* and is opposite the side edge 123*c*. The oblique edge 123*d* is substantially linear and forms an oblique angle with each of the first and second ends 123*a*, 123*b* of the body 123.

The top plate 120 also includes an extension 121 that extends from a second end 123*b* of the body 123 opposite the first end 123*a*. The extension 121 is coplanar with the body 123 and is sized and dimensioned to extend over a portion of the shell 250 of the second leaf 210 when the continuous hinge 100 is in the closed position as shown in FIG. 5. The extension 121 includes a first or pivot opening 122 that extends through the extension 121 to provide access to the cavity 259 of the second leaf 210. The pivot opening 122 may define a circular or hexagonal opening. In some embodiments, the pivot opening 122 is a hexagonal opening that receives an insert as described in greater detail below. The oblique edge 123*d* may continue to define an edge of the extension 121.

The body 123 includes a shoot bolt ring 124 that has a second or shoot bolt opening 125 defined therethrough that provides access to the chamber 154 of the first leaf 110 (FIG. 6). The shoot bolt ring 124 may extend beyond the oblique edge 123*d* of the body 123. The shoot bolt ring 124 may also extend above a plane defined by the body 123 in a manner similar to the ridges 127. The shoot bolt opening 125 may be sized and dimensioned to allow a shoot bolt, e.g., shoot bolt 390, to pass through the shoot bolt opening 125. The body 123 also includes a shoot recess 126 profiled into the oblique edge 123*d* that is sized and dimensioned to receive the shoot bolt ring 224 of top plate 220 when the continuous hinge 100 is in the closed position.

As detailed above, the continuous hinge 100 is secured to side edges of adjacent panels of a door panel system, e.g., side edges 42, without additional machining to the side edges of the panels. For example, the continuous hinge 100 does not require machining of grooves, mortises, channels, and the like in the side edges. The continuous hinge 100 is secured to the side edges by one or more fasteners that pass through the continuous hinge 100 and into the side edge. By not requiring additional machining of the side edges of the panels, assembly of a door panel system 100 may be simplified which may reduce an amount of time required to assembly the door panel system. By reducing the amount of time and/or reducing machining for assembly of a door panel system, a cost of the door panel system may be reduced. In addition, the continuous hinge 100 may include the weather strip 180 that is configured to provide a weather seal within the continuous hinge 100. The weather strip 180 may be customizable based on the weather seal required for a particular application. Further, the weather strip 180 may be replaceable when the continuous hinge 100 is in an open position which may reduce complexity of maintenance compared to other door panel systems.

Figure 19:
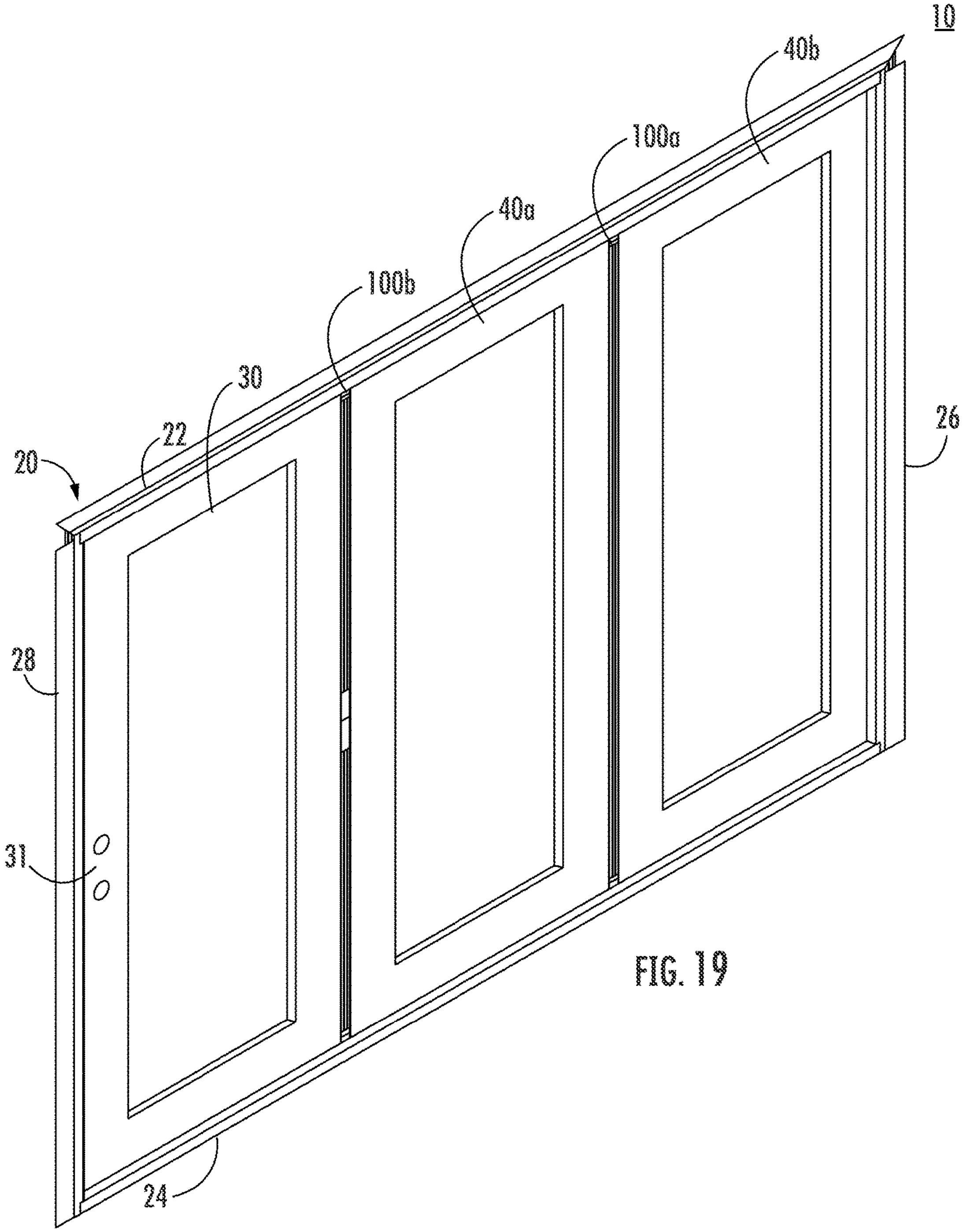
FIG. 19 is a perspective view of the door panel system of FIG. 1 in a closed configuration.
Figure 20:
FIG. 20 is a top view of the door panel system of FIG. 19.

Referring briefly back to FIG. 1, in open position of the continuous hinge 100*a*, the continuous hinge 100*a* may be disposed outside of the opening 12 and out of alignment with the top guide rail 22 and the bottom sill 24. In the closed position of the continuous hinge 100*a*, the continuous hinge 100*a* is disposed within the opening 12 between the top guide rail 22 and the bottom sill 24 of the frame 20 as shown in FIG. 19.

With particular reference to FIG. 4, when configured as a locking hinge, the continuous hinge 100*a* includes a top pivot 160 and a bottom pivot 170 (FIG. 15) secured to the shell 150 of the first leaf 110 and blank inserts 260 secured to the shell 250 of the second leaf 210. The top plate 220 of the second leaf 210 is coupled to the top pivot 160 and the bottom plate 230 of the second leaf 210 is coupled to the bottom pivot 170 to pivotally couple the second leaf 210 to the first leaf 110 about the top and bottom pivots 160, 170. The top and bottom pivots 160, 170 are similar to one another; as such, only the top pivot 160 will be detailed herein for brevity.

The top pivot 160 includes a housing 162, a pivot post 164, a bearing 166, and a retainer 168. The housing 162 is secured in the cavity 159 of the shell 158 of the first leaf 110. The pivot post 164 extends from the housing 162 and passes through the pivot opening 222 of the top plate 220 of the second leaf 210. The bearing 166 is disposed about the pivot post 164 below the top plate 220. The retainer 168 is disposed about the pivot post 164 and is configured to retain the pivot post 164 within the pivot opening 222. The pivot post 164 defines a pivot axis between the first and second leaves 110, 210.

Figure 9:
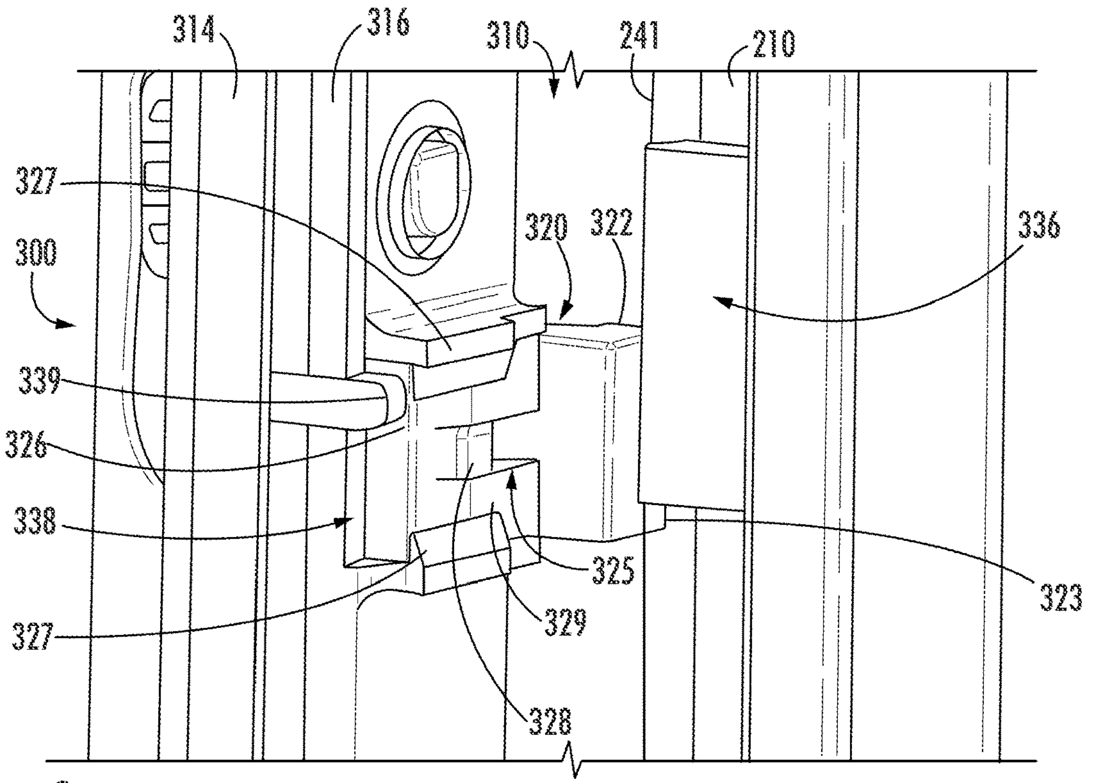
FIG. 9 is a front perspective view of the locking assembly of FIG. 7 in a locked configuration.
Figure 10:
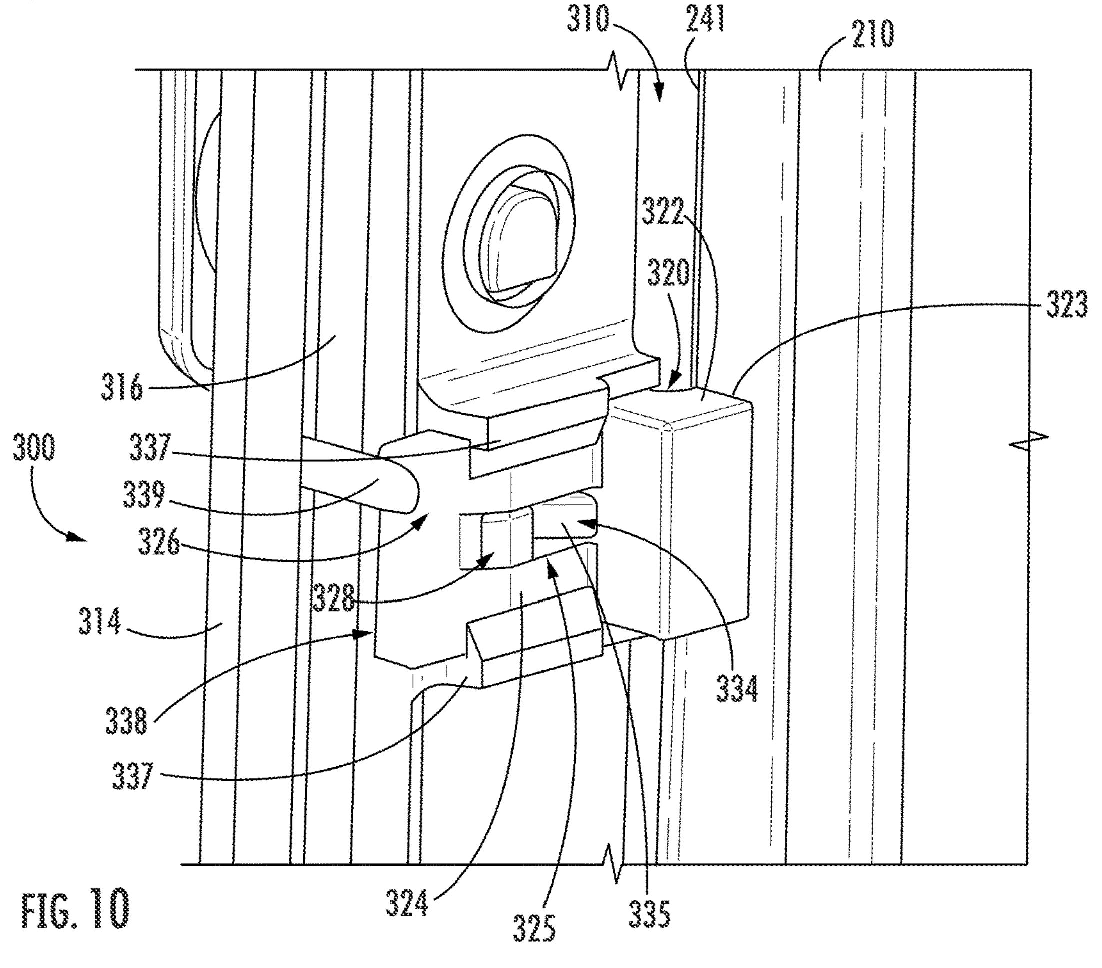
FIG. 10 is a front perspective view of the locking assembly of FIG. 9 in an unlocked configuration.
Figure 11:
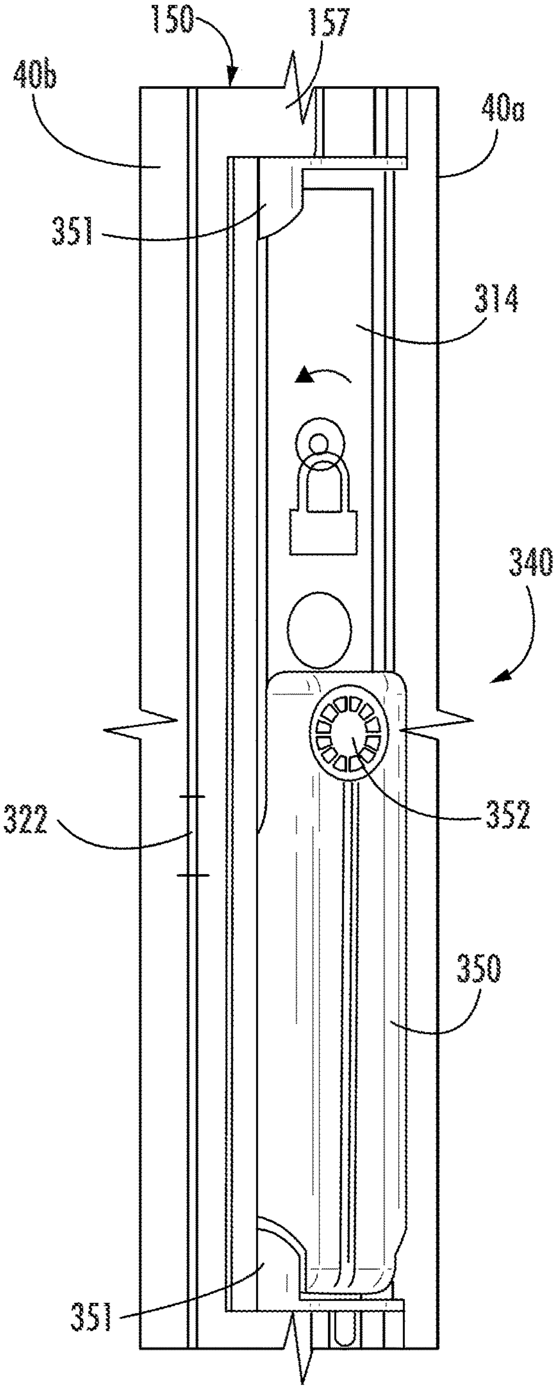
FIG. 11 is another rear perspective view of the locking assembly of FIG. 7 with a locking lever of the locking assembly in a locked position.

Referring to FIGS. 7-10, the continuous hinge 100*a* includes a locking assembly 300 that is configured to lock the continuous hinge 100*a* in the closed position. The locking assembly 300 may include a hinge lock mechanism 310 that is configured to selectively secure the first and second leaves 110, 210 in the closed position. The lock mechanism 310 is secured within a lock niche 312 defined in the shell 150 of the first leaf 110 and includes a latch 320 and a latch release button 330. The lock mechanism 310 is disposed substantially within the cavity 159 (FIG. 5) of the shell 150 and is supported by a lock face 314 and a lock housing 316 of the locking assembly 300. The lock face 314 and the lock housing 316 are disposed within the lock niche 312 at a position in the continuous hinge 100 comfortable for operation, e.g., in a range of about 24 inches to about 60 inches from a floor. The lock housing 316 is disposed within the shell 150 along the second wall 157 and includes latch retainers 337 that define a latch slot 338 that receive the latch 320. The latch retainers 337 allow the latch 320 to translate within the latch slot 338 between a locked position (FIGS. 7 and 9) and an unlocked position (FIG. 10). The lock housing 316 also includes a biasing flange 339 that supports a biasing member (not shown) configured to urge the latch 320 towards the locked position. The biasing member may be a coil spring or a compression spring.

Figure 7:
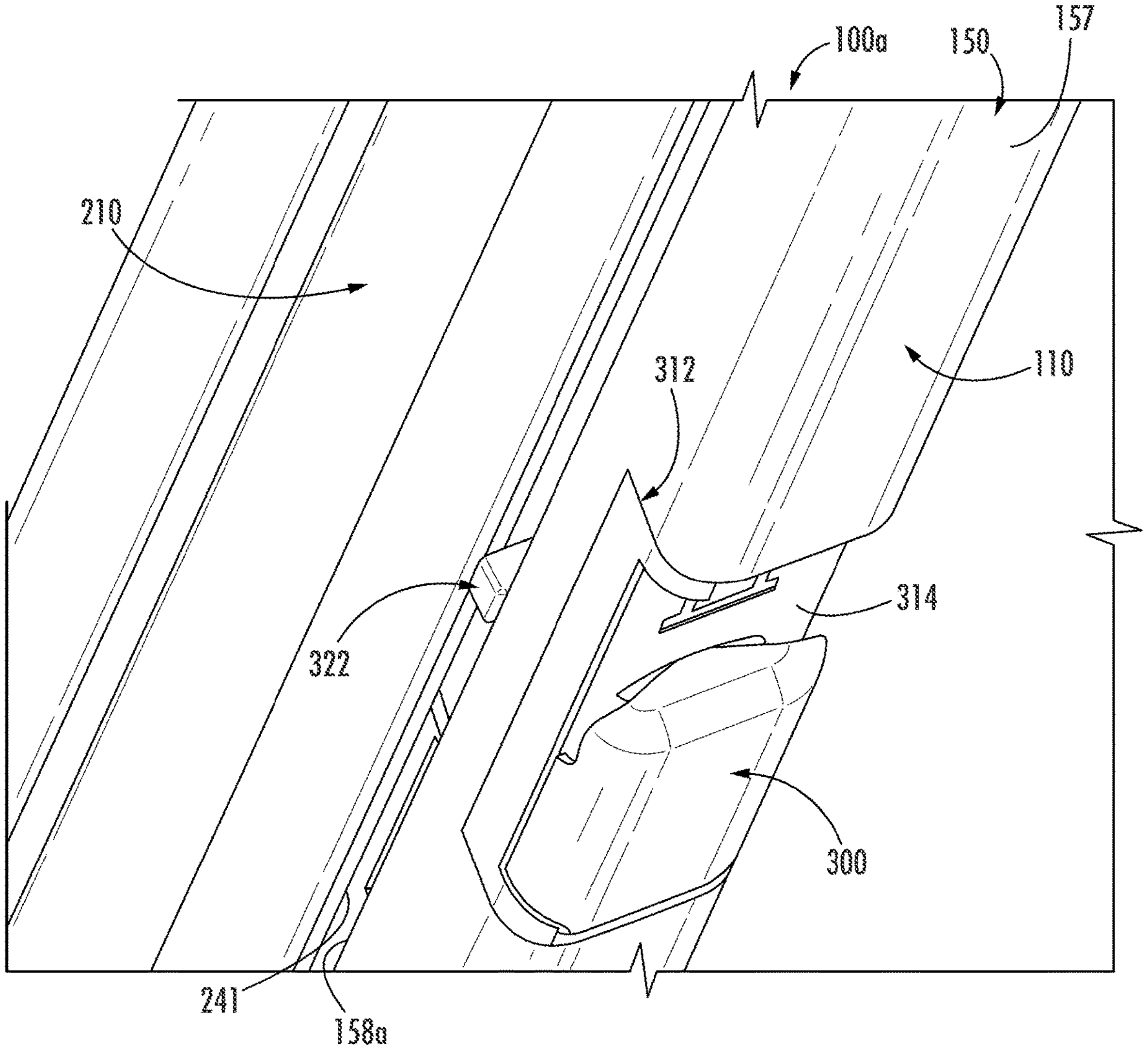
FIG. 7 is an enlarged rear perspective view of another portion of the locking hinge of FIG. 3 illustrating a locking assembly with the locking hinge in a locked position.
Figure 8:
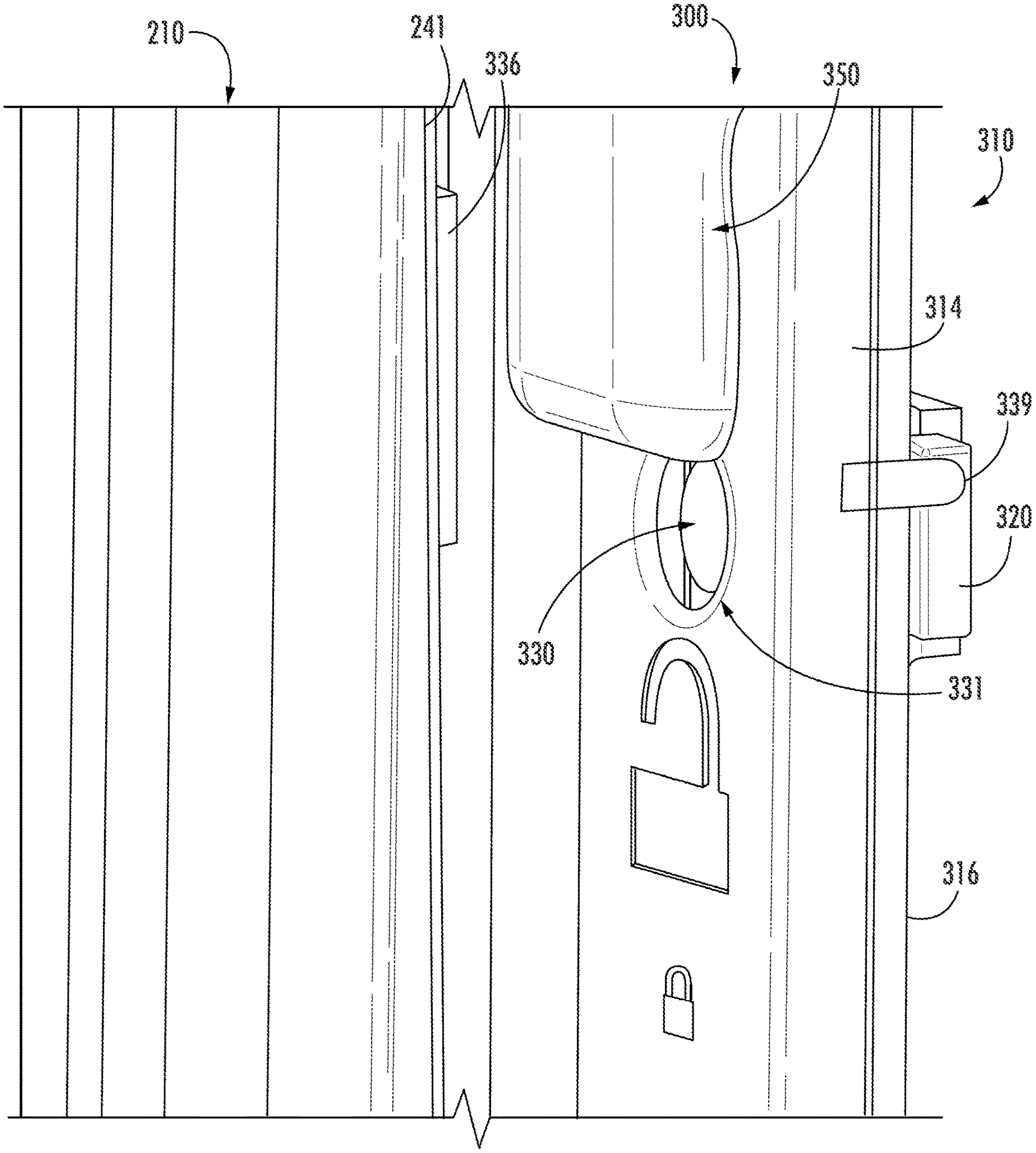
FIG. 8 is an enlarged respective view of the locking assembly of FIG. 7 in an open position with a panel and the first leaf removed to illustrate internal components of the locking assembly.

The latch 320 includes a body 324 and a latch key 322 that extends from the body 324. With particular reference to FIG. 7, when the continuous hinge 100*a* is in the closed position, the locking edge 241 of the second leaf 210 opposes the shell edge 158*a* of the first leaf 110 leaving a gap therebetween. In the locked position, the latch key 322 is configured to be positioned between the locking edge 241 and the shell edge 158*a* to prevent the first and second leaves 110, 210 from moving from the closed position. Specifically, the latch key 322 prevents the shell 150 of the first leaf 110 from rotating towards the second leaf 210 to prevent the first and second leaves 110, 210 from moving from the closed position. The latch body 324 may define a biasing pocket 326 extending in a direction parallel to translation of the latch 320 within the latch slot 338. The biasing pocket 326 is configured to receive the biasing member that is engaged with the biasing flange 339 to urge the latch 320 towards the locked position.

The latch release button 330 is received within a button hole 331 defined through the lock face 314 and the lock housing 316 and in communication with the latch slot 338. The release button 330 includes a retainer 332 (FIG. 13) and a release cam 334. The retainer 332 is configured to prevent the release button 330 from extending beyond the lock face 314. The latch 320 includes a cam slot 325 defined through the latch body 324. The cam slot 325 is aligned with the button hole 331 and receives the release cam 334 there-within. The release cam 334 includes a tapered release surface 335 that is engaged with an end of the cam slot 325. The release button 330 has an undepressed position in which the release cam 334 is positioned within cam slot 325 to limit translation of the latch 320 towards the locked position. Specifically, the release surface 335 is engaged with the end of the cam slot 325 to prevent the latch 320 from extending beyond the locked position. The release button 330 also has a depressed position in which the release button 330 is depressed into the button hole 331 such that the release cam 334 extends through the cam slot 325 such that the release surface 335 engages the end of the cam slot 325 to translate the latch 320 against the bias of the biasing member towards the unlocked position as shown in FIG. 10. The latch 320 may interact with the release surface 335 to bias the release button 330 towards the undepressed position.

The cam slot 325 may include a roller 328 supported by the latch body 324 within the cam slot 325 adjacent the end of the cam slot 325 engaged by the release surface 335. The roller 328 may reduce frictional forces between the release surface 335 and the latch 320 such that a force required to depress the release button 330 from the undepressed position to the depressed position is reduced. The roller 328 may also prevent the latch 320 from binding in the locked and/or unlocked position. In the unlocked position, the latch key 322 is withdrawn from between the shell edge 158*a* and the locking edge 241 such that the first and second leaves 110, 210 can rotate to an open position from the closed position.

With particular reference to FIG. 9, the locking edge 241 of the second leaf 210 may engage the latch key 322 to translate the latch 320 towards the unlocked position as the first and second leaves 110, 210 transition from an open position to the closed position. When the first and second leaves 110, 210 reach the closed position, the biasing member returns the latch 320 to the locked position. The latch key 322 includes a leading edge 323 that is configured to engage the locking edge 241 such that the locking edge 241 translates the latch 320 towards the unlocked position. The second leaf 210 may include a latch strike 336 that is secured second leaf 210 and positioned to engage the leading edge 323 as the first and second leaves 110, 210 approach the closed position to translate the latch 320 towards the unlocked position. In the closed position of the first and second leaves 110, 210, the latch strike 336 may reinforce and/or stiffen the locking edge 241 to prevent the first and second leaves 110, 210 from inadvertently moving from the closed position.

Figure 13:
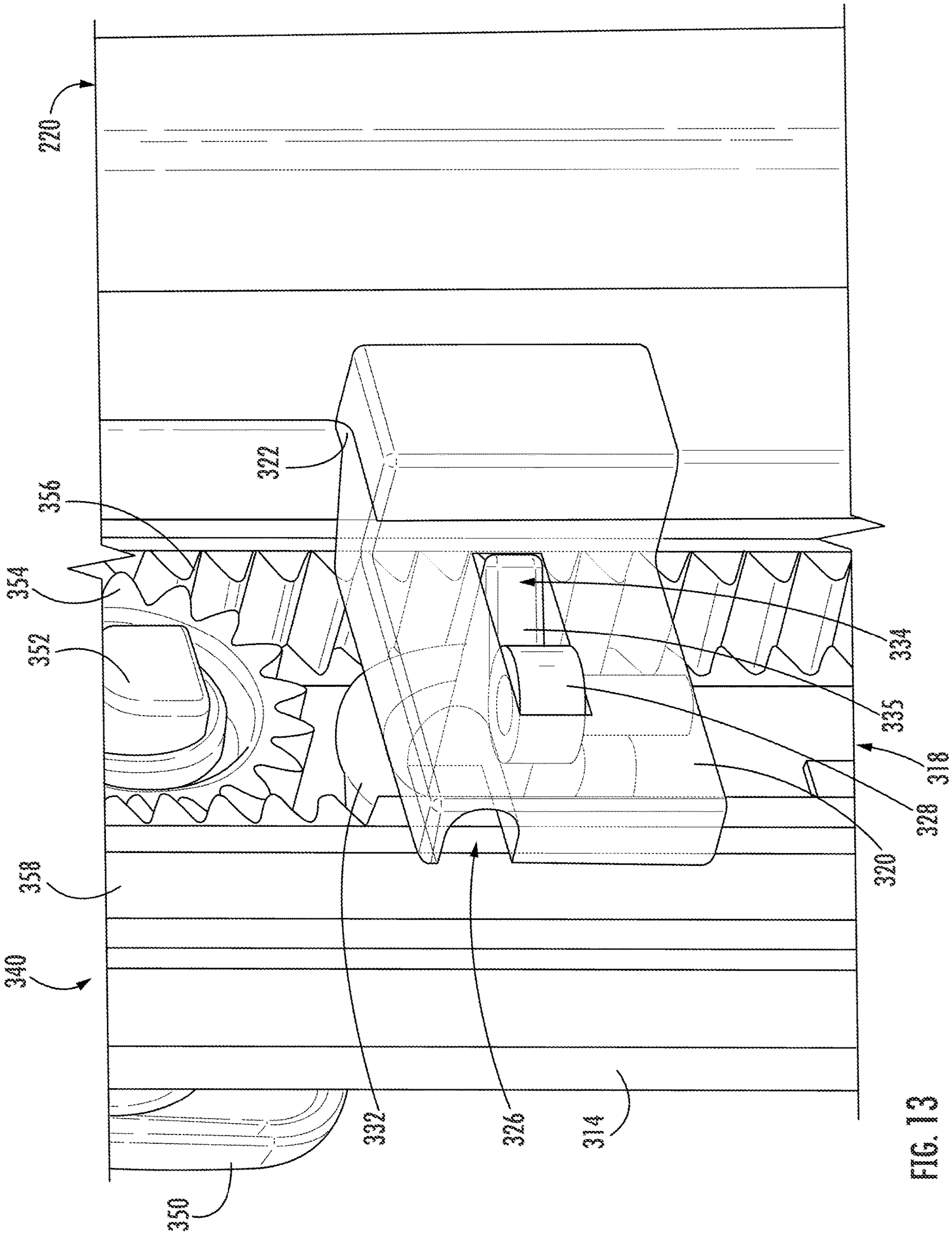
FIG. 13 is an enlarged front perspective view of the locking assembly of FIG. 10 with a locking housing removed and a body of a latch of the locking assembly in phantom to show internal components of the locking assembly.
Figure 14:
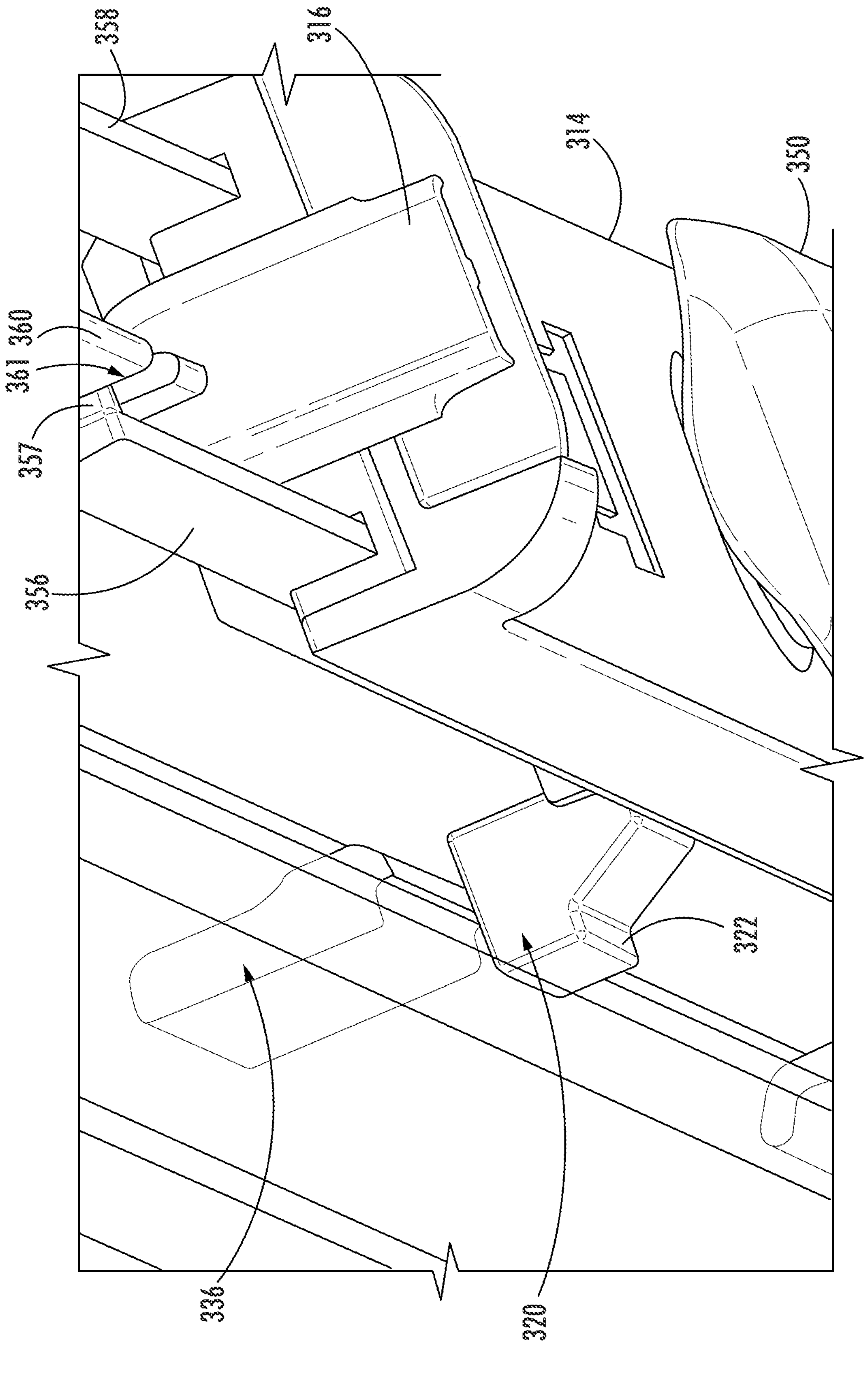
FIG. 14 is an enlarged top, rear perspective view of components of the locking assembly of FIG. 7.
Figure 15:
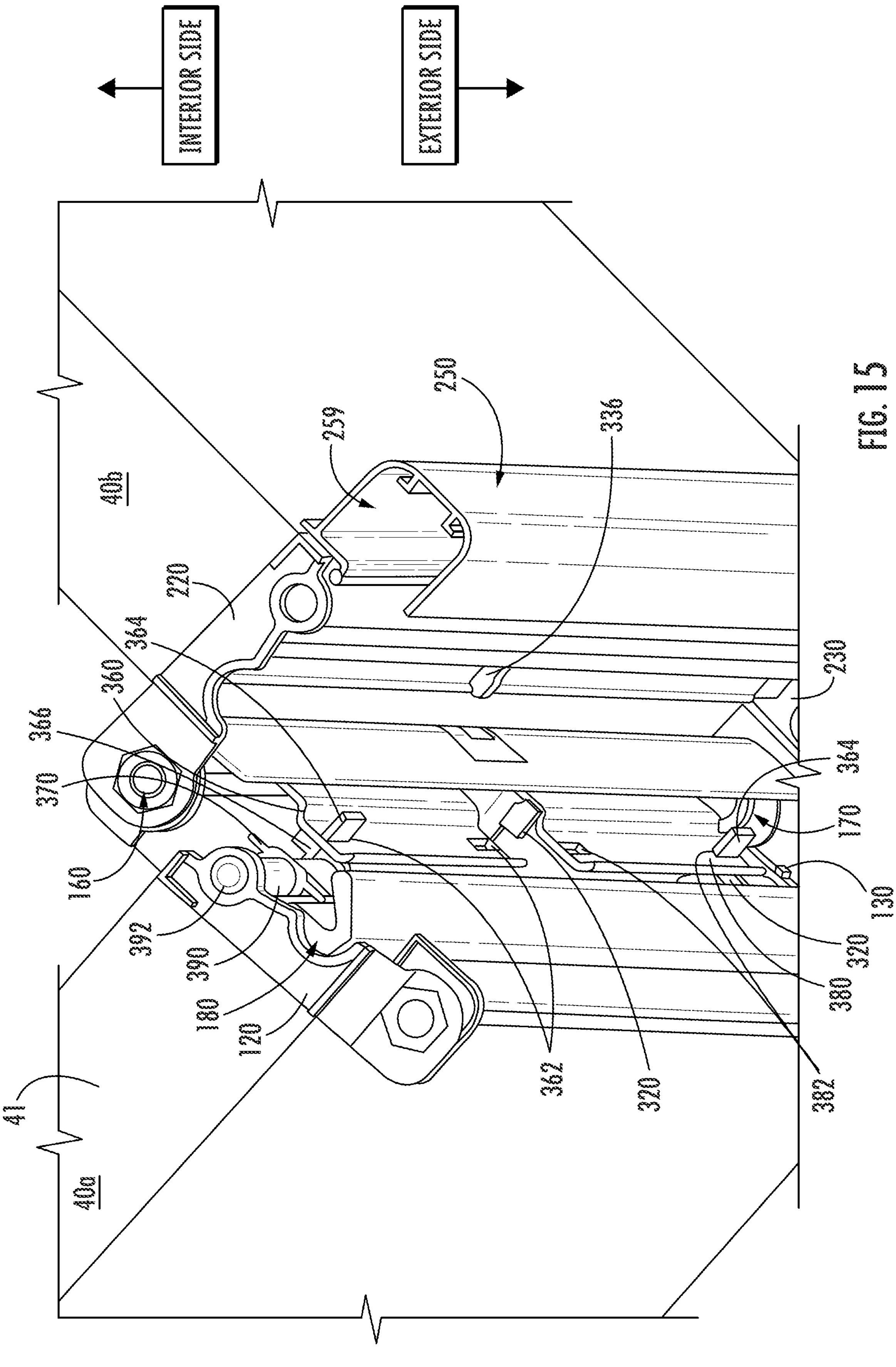
FIG. 15 is a front perspective view of the locking hinge of FIG. 2.
Figure 16:
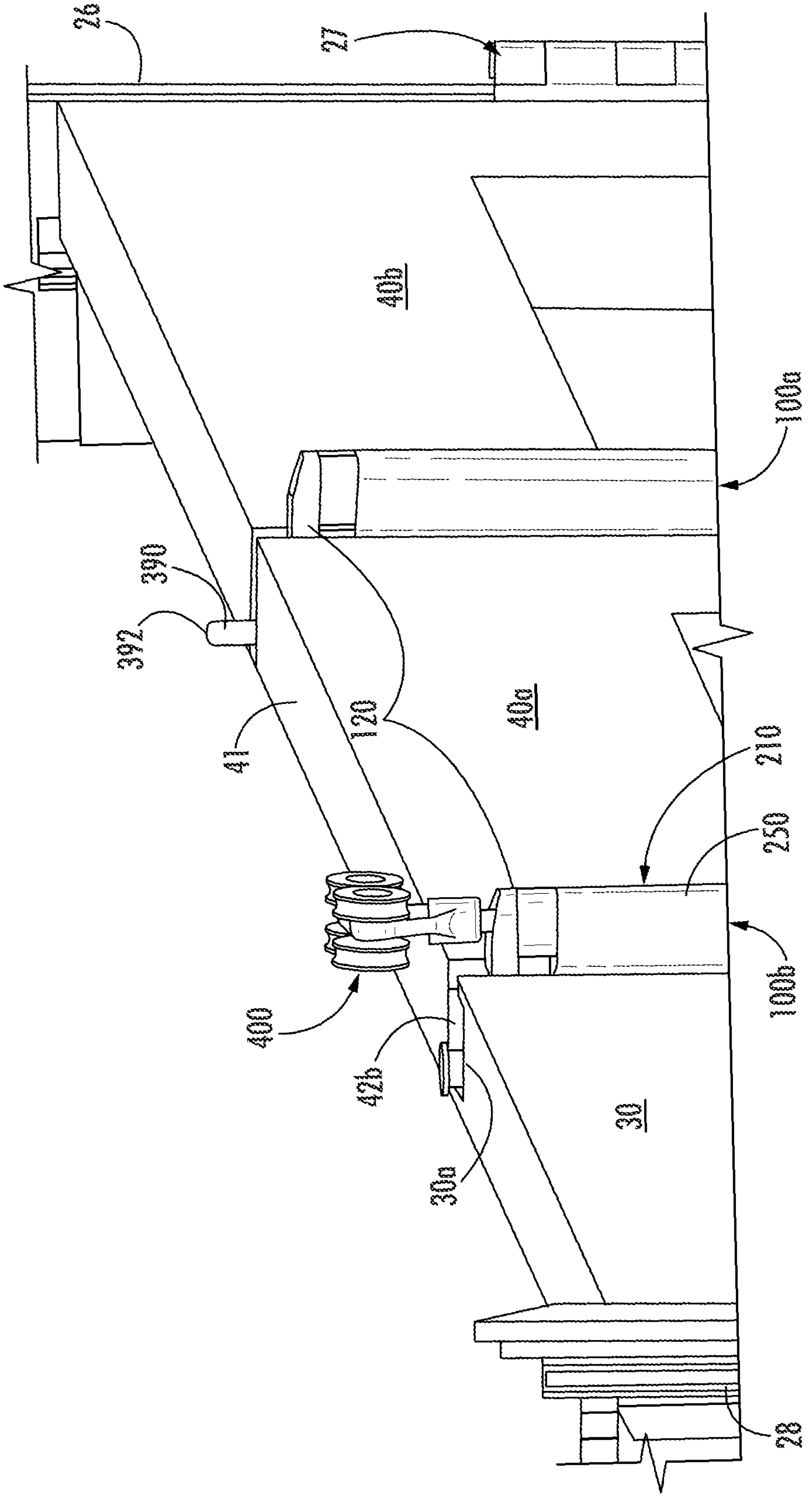
FIG. 16 is a top perspective view of a portion of the door panel system of FIG. 1 in a closed configuration.

Referring now to FIGS. 11-15, the locking assembly 300 may also include a shoot bolt assembly 340 configured to transition top and bottom shoot bolts 390 between a retracted position (FIG. 15) and an extended position (FIG. 16). The shoot bolt assembly 340 is actuated between the retracted and extended positions by rotation of a lock lever 350 between a locked position (FIG. 14) and an unlocked position (FIG. 15). The lock lever 350 is secured to the lock face 314 by a lever pivot 352. The lever pivot 352 is rotatably fixed to the lock lever 350 such that the lever pivot 352 cooperates with rotation of the lock lever 350. The lock face 314 may include stops 351 to prevent the lock lever 350 from rotating beyond the locked and/or unlocked positions. The lock face 314 may also include visual indicia to indicate whether the lock lever 350 is in the locked and/or unlocked position. In addition, in the locked position, the lock lever 350 may cover the button hole 331 to prevent actuation of the latch release button 330 when the lock lever 350 is in the locked position.

The shoot bolt assembly 340 includes the lock lever 350, a rack 356, 358, a link 360, 380, an actuator 364, 384, a shoot bolt guide 370, and a shoot bolt 390. The shoot bolt assembly 340 may include a top shoot bolt 390, a bottom shoot bolt 390, or both top and bottom shoot bolts 390.

With particular reference to FIG. 13, the lock pivot 352 passes through the lock face 314 and into an actuation channel 318 defined between the lock face 314 and the lock housing 316. The lock pivot 352 is rotatably fixed to a lever gear 354 disposed within the actuation channel 318. The lock pivot 352 may be shaped or keyed to the lever gear 354 such that the lock pivot 352 may slide in and out of the lever gear 354 while being rotatably fixed relative to the lever gear 354. The lock pivot 352 may be secured within the lever gear 354 by a pin (not shown) passing through the lock pivot 352.

The lever gear 354 is meshingly engaged with a top rack 356 and a bottom rack 358. The top and bottom racks 356, 358 are disposed within the actuation channel 318 on either side of the lever gear 354 in opposition to one another. As shown, the top rack 356 is disposed adjacent the third wall 158 of the shell 150 and the bottom rack 358 is disposed adjacent the first wall 156 of the shell 150. The top and bottom racks 356, 358 are configured to translate in opposite directions in response to rotation of the lock lever 350. For example, as the lock lever 350 rotates from the unlocked position to the locked position, the top rack 356 translates upward and the bottom rack 358 translates downward such that both the top and bottom racks 356, 358 translate in opposite directions away from the lock pivot 352. Similarly, as the lock lever 350 rotates from the locked position to the unlocked position, the top rack 356 translates downward and the bottom rack 358 translates upwards such that both the top and bottom racks 356, 358 translate in opposite directions towards the lock pivot 352.

Referring now to FIG. 14, the top rack 356 extends through a slot in a top surface of the lock face 314 and includes a foot 357. The foot 357 is received within a groove 361 defined in the top link 360 and is configured to translate the top link 360 vertically. The foot 357 may be coupled to the top link 360 by one or more fasteners. The bottom rack 358 may also extend through a slot in the top surface of the lock face 314 to allow for a full actuation of the shoot bolt 390 associated with the bottom rack 358. Similarly and not shown for simplicity, the bottom rack 358 extends through a slot in the bottom surface of the lock face 314 and includes a foot (not shown) that is received within a groove (not shown) of the bottom link 380 and a portion of the top rack 356 may extend through a slot in the bottom surface of the lock face 314. The foot of the bottom rack 358 may be longer than the foot 357 of the top rack 356 such that the top and bottom links 360, 380 may be aligned with one another.

Figure 12:
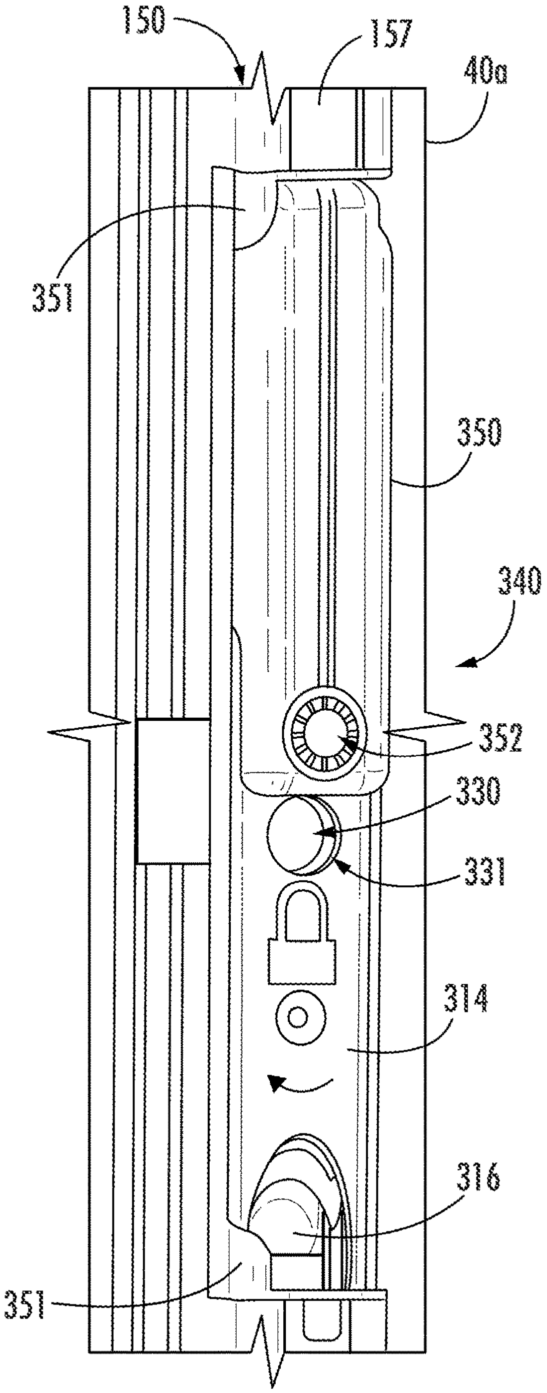
FIG. 12 is a rear perspective view of the locking assembly of FIG. 11 with the locking lever in an unlocked position.

With reference to FIG. 15, the top and bottom links 360, 380 are each coupled to a respective one of the top or bottom shoot bolts 390 to extend the shoot bolts 390 when the lock lever 350 is in the locked position (FIG. 11) and to retract the shoot bolts 390 when the lock lever 350 is in the unlocked position (FIG. 12). In the extended position (FIG. 16), the top shoot bolt 390 extends beyond the top plate 120 and into a locking hole 23 (FIG. 2) defined in the top rail 22 of the frame 20 and the bottom shoot bolt 390 extends beyond the bottom plate 130 and into the bottom sill 24 of the frame 20 to secure the continuous hinge 100 in position within the frame 20 and prevent the panels 40 from moving from the closed position. In the retracted position (FIG. 15), the shoot bolts 390 are at or within the top and bottom plates 120, 130, respectively, such that the continuous hinge 100 is moveable from the closed position.

The top link 360 is positioned between the top rack 356 and the top shoot bolt 390 and is configured to operably couple translation of the top rack 356 to translation of the top shoot bolt 390. The top link 360 includes an opening 362 that passes through the top link 360 adjacent a top of the top link 360. The opening 362 receives a bolt actuator 364 that passes through the opening 362. The bolt actuator 364 is coupled to the top shoot bolt 390. The actuator 364 may include a shoot holder 366 in the form of a ring that extends around the shoot bolt 390 to couple the actuator 364 to the shoot bolt 390. The shoot bolt 390 may pass through a shoot bolt guide 370.

Referring briefly back to FIG. 5, the shoot bolt guide 370 includes finger catches 372 and a shoot passage 374. The finger catches 372 are defined in opposite ends of the shoot bolt guide 370 and are configured to receive the opposing retaining fingers 155 of the first leaf 110 to secure the shoot bolt guide 370 within the first leaf 110. The retaining fingers 155 may also align the shoot bolt guide 370 with the shoot bolt opening 125 of the top plate 120. The shoot passage 374 passes through the shoot bolt guide 370 and is configured to guide translation of the shoot bolt 390 through the shoot bolt opening 125 of the top plate 120. The shoot bolt 390 may include a tapered leading end 392 to guide the shoot bolt 390 through the shoot bolt opening 125 and/or into the top rail 22 as detailed below.

With reference to FIG. 15, the bottom link 380 is positioned between the bottom rack 358 and the bottom shoot bolt 390 and is configured to operably couple translation of the bottom rack 358 to translation of the bottom shoot bolt 390. The bottom link 380 includes an opening 382 that passes through the bottom link 380 adjacent a bottom of the bottom link 380. The opening 380 receives a bolt actuator 364 that passes though the opening 382. The bolt actuator 364 is coupled to the bottom shoot bolt 390. The bottom shoot bolt 390 and the top shoot bolt 390 are coaxial with one another about a common longitudinal axis. The bolt actuation 364 may include a shoot holder 366 in the form of a ring that extends around the shoot bolt 390 to couple the actuator 364 to the shoot bolt 390. The shoot bolt 390 may pass through a shoot bolt guide 370 that is secured within the first leaf 110 in a similar manner to the shoot bolt guide 370 adjacent the top plate 120 detailed above. The bottom shoot bolt 390 is configured to extend through the bottom plate 130 into the sill 24 as detailed below.

As detailed above, several of the components of the shoot bolt assembly 340 may be used to operably couple the rotation of the lock lever 350 to movement of the top shoot bolt 390 or to movement of the bottom shoot bolt 390. For example, the top and bottom rack 356, 358 may be interchangeable with one another and the top and bottom links 360, 380 may be interchangeable with one another. In addition, the actuator 364 and the shoot bolt guide 370 may be used in the top or bottom positions. Reducing the number of unique components to manufacturer the continuous hinge 100 may decrease inventory costs, tooling costs, and supply costs.

Figure 17:
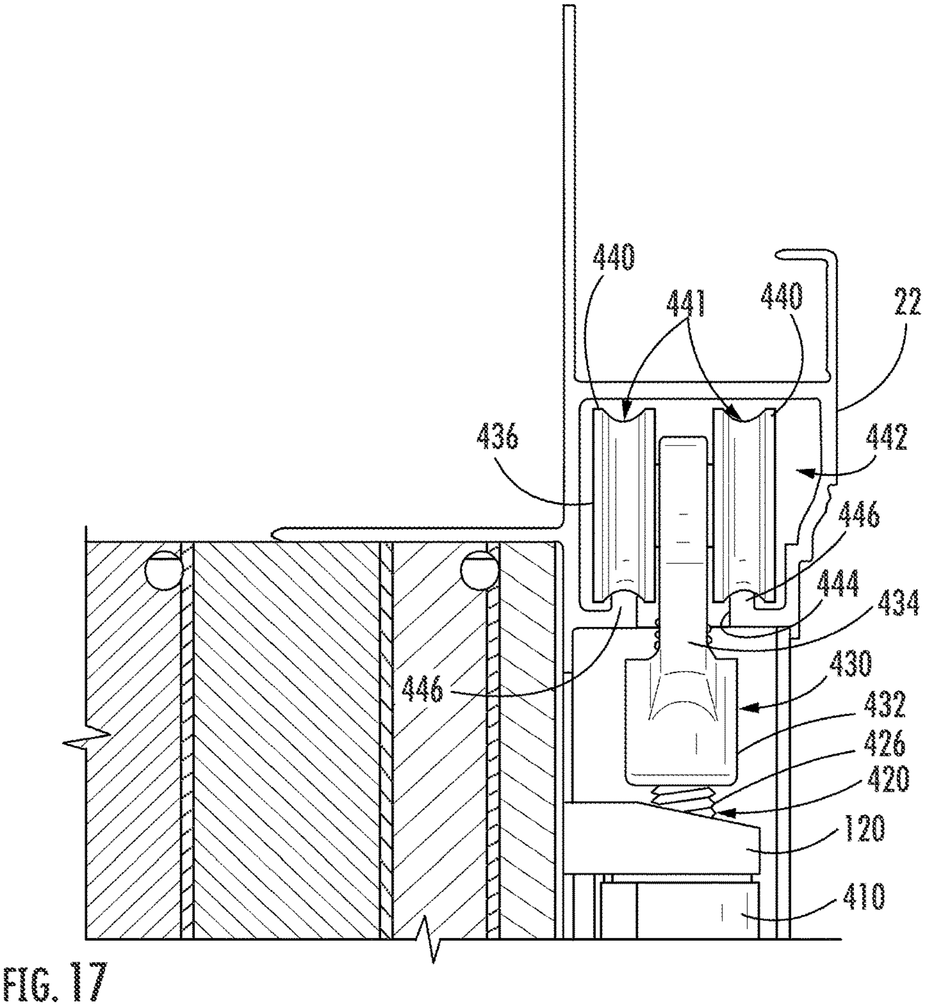
FIG. 17 is a cross-sectional view taken along the section line 17-17 of FIG. 1.
Figure 18:
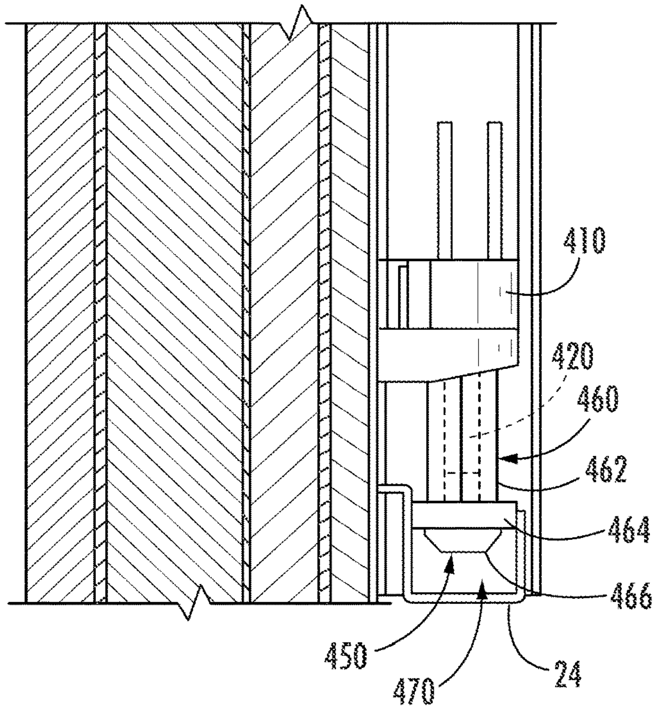
FIG. 18 is a cross-sectional view taken along the section line 18-18 of FIG. 1.

Referring now to FIGS. 16-18, the continuous hinge **100*b* secured between the operating panel 30 and the secondary panel 40*a* is assembled as a sliding hinge. The first and second leaves of the continuous hinge 100*b* are assembled and secured to the panels 30, 40 in a similar manner to the continuous hinge 100*a* detailed above. Although not explicitly shown, the first leaf of the continuous hinge 100*b* is secured to an edge 30*a* of the operating panel 30 and the second leaf of the continuous hinge 100*b* is secured to an edge 42*b* of the secondary panel 40*a*. However, unlike the continuous hinge 100*a* detailed above which pivots about a pivot axis passing through the shell 150 of the first leaf 110, the continuous hinge 100*b* pivots about a pivot axis passing through the shell 250 of the second leaf 210. The continuous hinge 100*b* includes an upper roller assembly or bogey 400 secured within the shell 250 and passing through the top plate 120 and a lower roller assembly 450 secured within the shell 250 and passing through the bottom plate 130. The upper and lower roller assemblies 400, 450 are coaxial with one another about the pivot axis of the continuous hinge 100*b***.

With particular reference to FIG. 17, the upper roller assembly 400 includes an insert 410, a pivot shaft 420, a truck 430, and rollers 440. The insert 410 is received in a top portion of the cavity 259 of the shell 258 of the second leaf 210 (FIG. 3). The insert 410 is secured within the cavity 259 in a manner similar to the top pivot 102 detailed above. The insert 410 may engage the pivot fingers 251 to secure the insert 410 within the cavity 259 and to position the insert 410 relative to the second leaf 210. The insert 410 includes a threaded hole (not shown) that receives the pivot shaft 420 therethrough. The pivot shaft 420 may include a lower threaded portion that is secured within the insert 410. The pivot shaft 420 includes an upper threaded portion 426 that extends above the top plate 120. The pivot shaft 420 may include a non-threaded pivot surface between the lower threaded portion and the upper threaded portion 426. The pivot surface may be configured to be positioned within the pivot opening 122 (FIG. 3) of the top plate 120 to provide a smooth surface for engagement between the pivot shaft 420 and the top plate 120.

The truck 430 includes a mount 432, axle mounts 434, and axles 436. The mount 432 is substantially cylindrical and defines a threaded hole 433 therethrough. The mount 432 is threaded onto the upper threaded portion 426 of the pivot shaft 420. The axle mounts 434 each extend from the sides of the mount 432 an angle to avoid interference with the pivot shaft 420. The angle and length of the axle mounts 434 are determined to allow for clearance of rollers 440 with one another and with the pivot shaft 420. Each of the axle mounts 434 supports an axle 436 that passes through an upper portion of the respective axle mount 434. A roller 440 is received on either end of each axle 436 such that the upper roller assembly 400 includes four rollers 440. In embodiments, the truck 430 may include a single axle mount 434 and two rollers 440. In other embodiments, the truck 430 may include two axle mounts 434 with one roller 440 on each axle 436. In still other embodiments, the upper roller assembly 430 may include more than two axle mounts 434 with one or two rollers 440 on each axle 436.

The top guide rail 22 may define a roller channel 442 and a shaft slot 444 positioned between tracks 446. The rollers 440 each define a groove 441 that is configured to receive a respective one of the tracks 446 such that the rollers 440 roll along the tracks 446. The rollers 440 are configured to hang from the tracks 446 to support the weight of the continuous hinges 100 and the panels 30, 40. As shown in FIG. 16, the upper roller assembly 400 and hinges 27 on the fixed jamb 26 are the only elements of the door panel system 10 configured to support the weight of the panels 30, 40 and the continuous hinges 100. As such, the upper roller assembly 400 is sized to evenly distribute the weight of the continuous hinges 100 and the panels 30, 40 along the track 446 as the panels 30, 40 move between the open and closed positions as detailed below.

The lower roller assembly 450 includes an insert 410, a pivot shaft 420, and a roller guide assembly 460. The insert 410 is received in a bottom portion of the cavity 259 of the shell 258 of the second leaf 210. The insert 410 is secured in a manner similar to the bottom pivot 104 detailed above. The insert 410 may engage the pivot fingers 251 to secure the insert 410 within the cavity 259 and to position the insert 410 relative to the second leaf 210. The insert 410 includes a threaded hole (not shown) that receives the pivot shaft 420 therethrough. The pivot shaft 420 may include an upper threaded portion that is secured within the insert 410. The pivot shaft 420 includes a lower threaded portion 426 that extends below the bottom plate 130. The pivot shaft 420 may include a non-threaded pivot surface between the upper threaded portion and the lower threaded portion 426. The pivot surface may be configured to be positioned within the pivot opening (not explicitly shown) of the bottom plate 130 to provide a smooth surface for engagement between the pivot shaft 420 and the bottom plate 130.

The roller guide assembly 460 includes a housing 462 and a roller 464 disposed about a lower portion of the housing 462. The housing 462 is threaded over the lower threaded portion 426 of the pivot shaft 420. The roller 464 is rotatable relative to the housing 462 about the pivot axis that is coaxial with a central longitudinal axis of the housing 462. The roller 464 is sized to fit within a guide channel 470 defined in the sill 24. The roller 464 is configured to slide within the guide channel 470 to retain the lower portion of the continuous hinge **100*b* within the opening 12 of the frame 20. The housing 462 may include a bottom tip 466 that extends below the roller 464. The bottom tip 466 is configured to be positioned above a bottom of the guide channel 470. The position of the roller 464 within the channel 470 may be adjusted by threading or unthreading the housing 462 over the pivot shaft 420. As noted above, the entire weight of the panels 30, 40 and the continuous hinges 100 are supported by the upper roller assembly 400 and the hinges 27 such that the lower roller assembly 450 is not configured to support a vertical load. In embodiments, the continuous hinge 100*b* may be provided without a lower roller assembly 450**.

Referring now to FIGS. 19-24, the operation of the door panel system 10 will be detailed with additional references to the locking assembly of FIGS. 7-15. Initially referring to FIGS. 19 and 20, the door panel system 10 is in the closed configuration with each of the operating panel 30 and secondary panels 40 in a closed position. In the closed position, each of the operating panels 30 and secondary panels 40 are aligned on edges with one another such that an inner and outer surface 34, 38, 44, 48 of each panel 30, 40 is coplanar with the inner and outer surfaces 34, 38, 44, 48 of the other panels 30, 40. In the closed configuration, the door panel system 10 may function as a wall or a barrier to prevent intrusion of air and water and prevent passage of animals or individuals therethrough. In the closed configuration, the latch 320 of any of the locking assemblies 310 is in the locked position. In addition, the lock lever 350 of any locking hinges, e.g., locking hinge **100*a*, is in the locked position such that the associated shoot bolts 390 are extended into the top rail 22 and/or bottom sill 24** to prevent the locking hinge from moving from the closed position.

The operating panel 30 may also include a lockset 31 adjacent the operating jamb 28 to prevent the operating panel 30 from moving from the closed position. The lockset 31 may include an operating latch and/or a deadbolt. The lockset 31 may be a single point lockset or a multipoint lockset and may include upper and lower extension bolts similar to the shoot bolts 390 detailed above.

Figure 21:
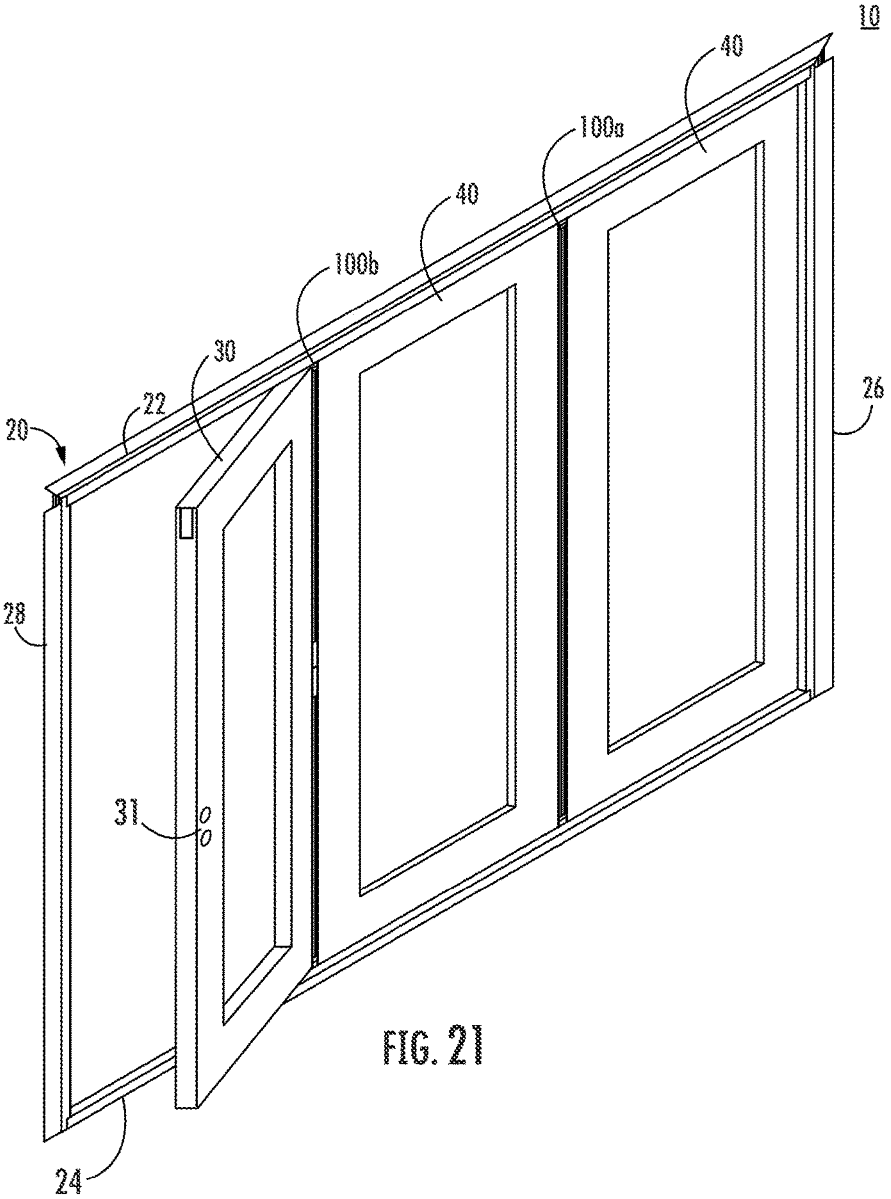
FIG. 21 is a perspective view of the door panel system of FIG. 1 with a locking hinge in a locked position and an operating panel in an open position.
Figure 22:
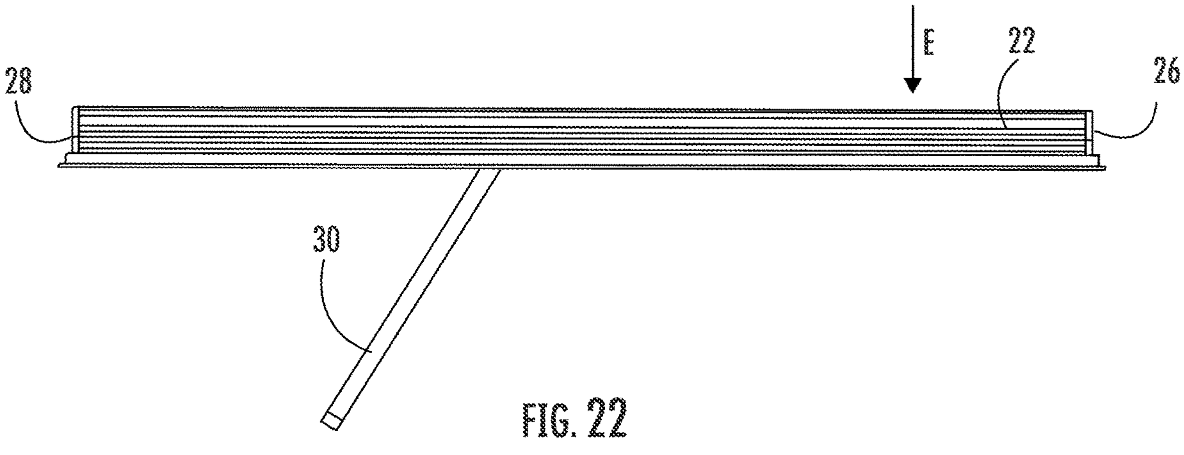
FIG. 22 is a top view of the door panel system of FIG. 21.

With reference to FIGS. 21 and 22, the operating panel 30 may be used as a standard door with the secondary panels 40 in the closed position. Specifically, with the locking assembly 310 in the locked position and the lock lever 350 in the locked position with the shoot bolts 390 extended, the lockset 31 may be used to open and close the operating panel 30 by pivoting the hinge **100*b*** between an open and closed position.

With the operating panel 30 in an open position, the secondary panels 40 can be moved to an open position by operating the locking assembly 300 of the continuous hinge **100*a*. First, the lock lever 350 is rotated from the locked position (FIG. 11) to the unlocked position (FIG. 12). Rotation of the lock lever 350 translates the shoot bolts 390 from the extended position to the retracted position such that the tips 392 of the shoot bolts 390 are at or within the top and bottom plates 120, 130, respectively. Rotation of the lock lever 350 also exposes the latch release button 330. With the lock lever 350 in the unlocked position, the latch release button 330 is depressed to translate the latch 320 from extended position to the retracted position such that the latch key 322 is withdrawn from between the first and second leaves 110, 210. With the latch release button 330 depressed, the continuous hinge 100***a* can be pushed outward, e.g., towards the exterior as indicated by arrow E in FIG. 22. Once the continuous hinge 100*a* moves from the closed position, the latch release button 330 can be released.

Figure 23:
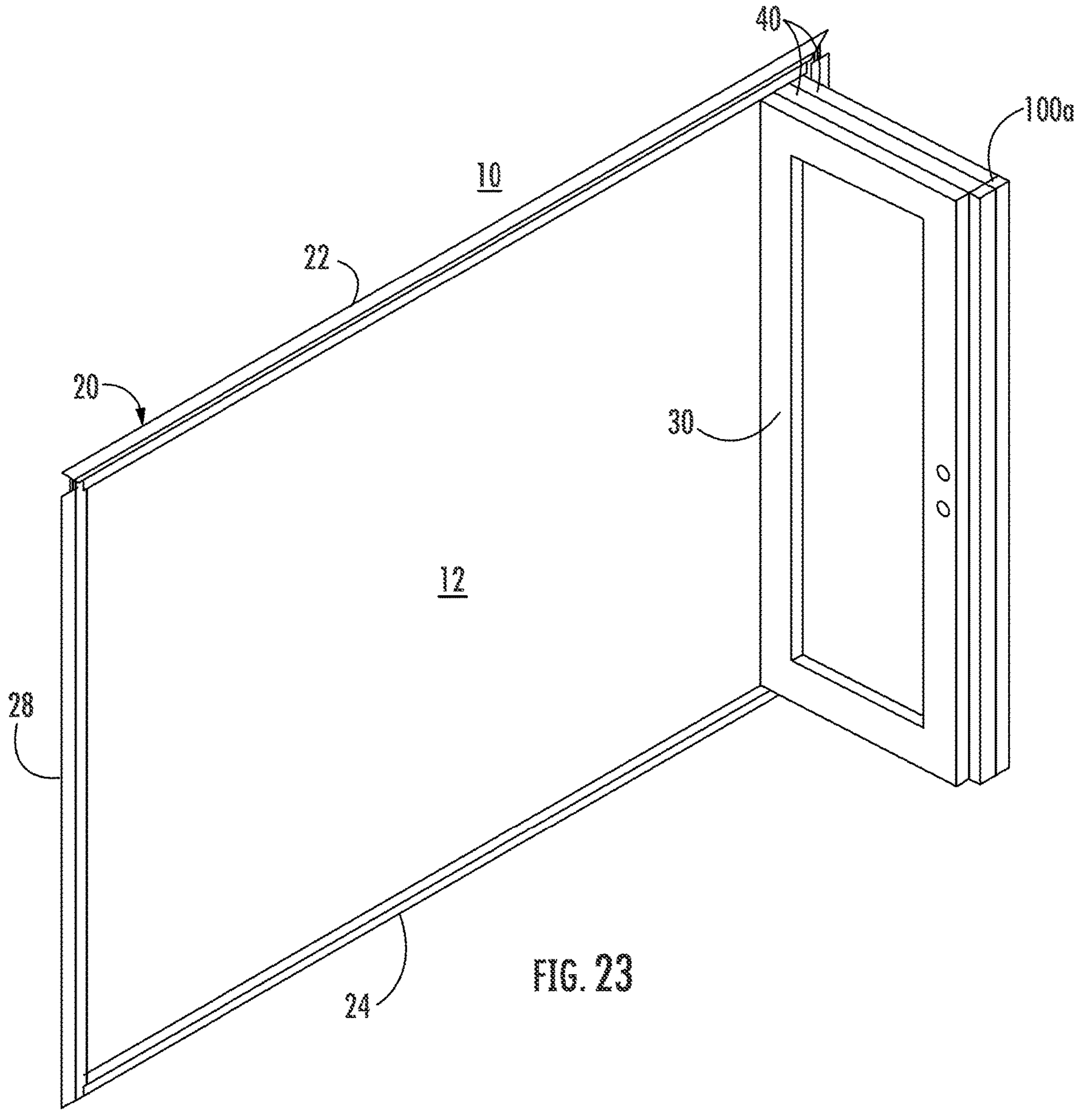
FIG. 23 is a perspective view of the door panel system of FIG. 1 in a fully open configuration.
Figure 24:
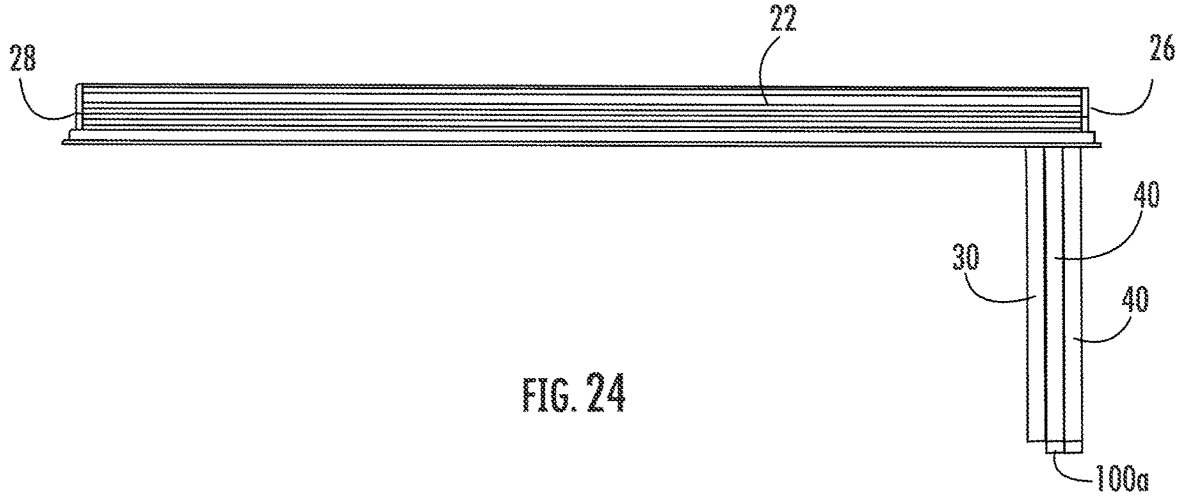
FIG. 24 is a top view of the door panel system of FIG. 23.

With the operating panel 30 and the secondary panels 40 in open positions, the operating panel 30 and the secondary panels 40 can be slid towards the fixed jamb 26 of the frame 20 until the panels 30, 40 are stacked relative to one another in a fully open configuration as shown in FIGS. 23 and 24. In the fully open configuration, the panels 30, 40 are parallel to one another and stacked such that interior or exterior surfaces of adjacent panels oppose one another. In some embodiments, the interior or exterior surfaces of adjacent panels may be in contact with one another.

To transition the door panel system from the fully open configuration to the closed configuration, the operating panel 30 or a sliding hinge, e.g., hinge 100*b*, can be drawn towards the operating jamb 28. As the operating panel 30 or the sliding hinge is drawn towards the operating jamb 28, the panels 30, 40 move towards the closed position. As the secondary panels 40 approach the closed position, the locking hinge 100 approaches its closed position. As the locking hinge 100*a* approaches its closed position, the latch key 322 of the latch 320 may engage the locking edge 241 of the second leaf 210 to urge the latch 320 towards the retracted position until the locking hinge 100*a* achieves the closed position. When the locking hinge 100*a* achieves the closed position, the latch key 322 is urged into the locked position between the locking edge 241 and the shell edge 158*a* as shown in FIG. 7. In the locked position, the latch 320 prevents the secondary panels 40 from moving from the closed position. To fully secure the secondary panels 40 in the closed position, the lock lever 350 is rotated from the unlocked position (FIG. 12) to the locked position (FIG. 11) to extend the shoot bolts 390 into the top rail 22 and the bottom sill 24, respectively. When the panels 40 are in the closed position, the shoot bolts 390 are substantially aligned with locking holes 23 (FIG. 2) in the top rail 22 and the bottom sill 24 such that the tapered tip 392 may engage the locking holes 23 to fully align the hinge 100*b* with the frame 20 as the shoot bolts 390 are extended. In addition, as the locking hinge 100 approaches its closed position, a weather strip, e.g., weather strip 180, may form a seal within the continuous hinge 100 as detailed above. With the secondary panels 40 in the closed position, the operating panel 30 may be pivoted to the closed position and operated using the lockset 31.

Figure 26:
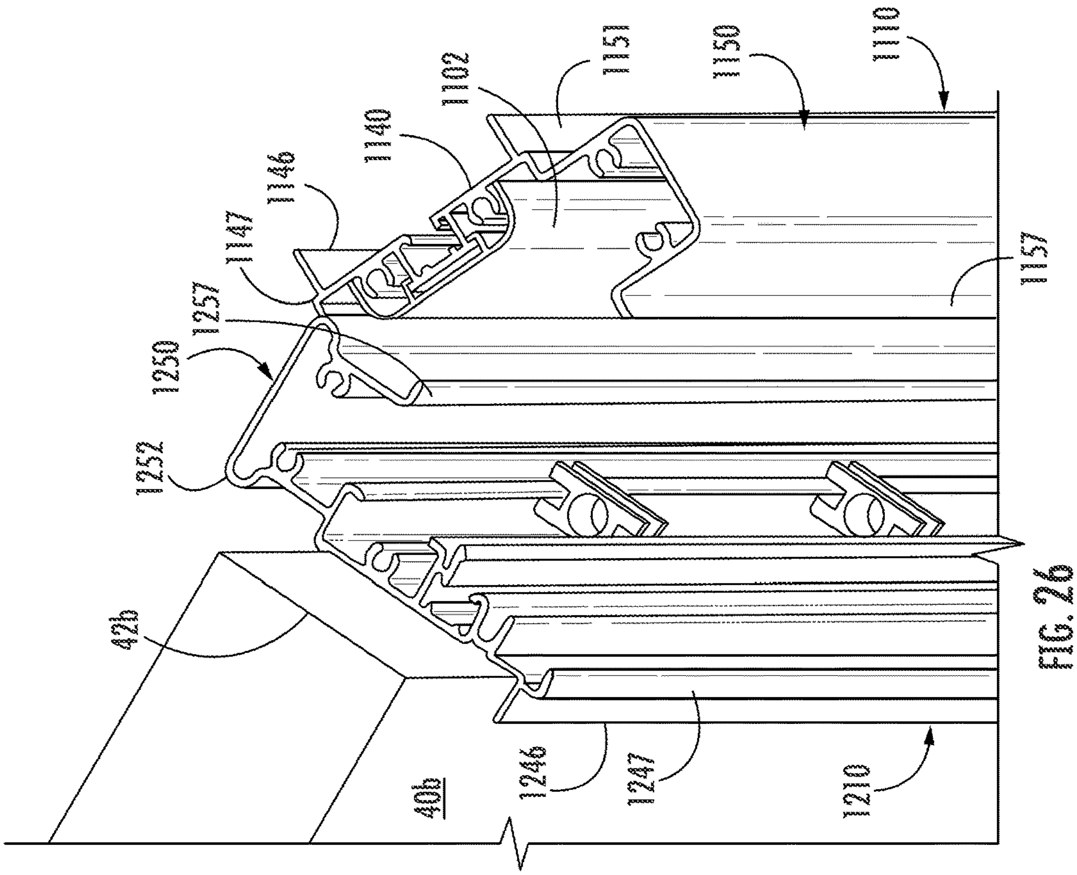
FIG. 26 is a perspective view of the leaves of the locking hinge of FIG. 25.
Figure 25:
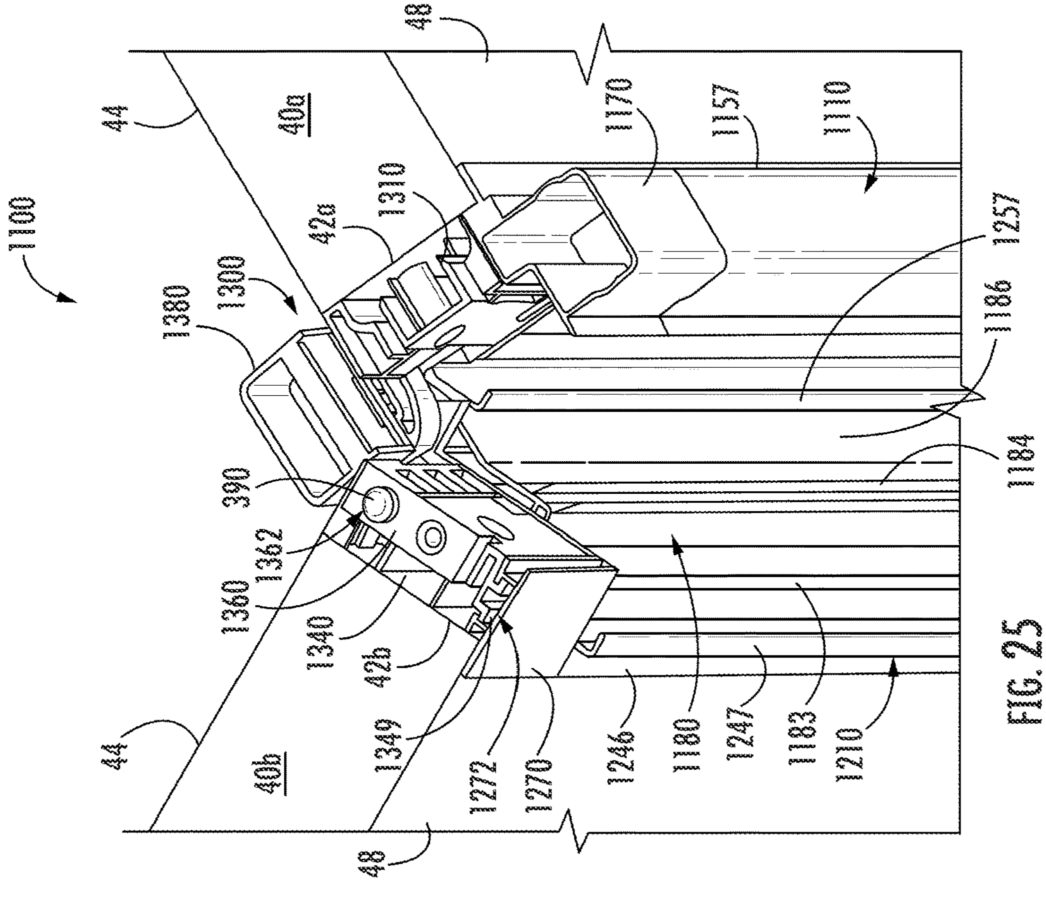
FIG. 25 is perspective view of a top portion another exemplary locking hinge provided in accordance with the present disclosure.
Figure 35:
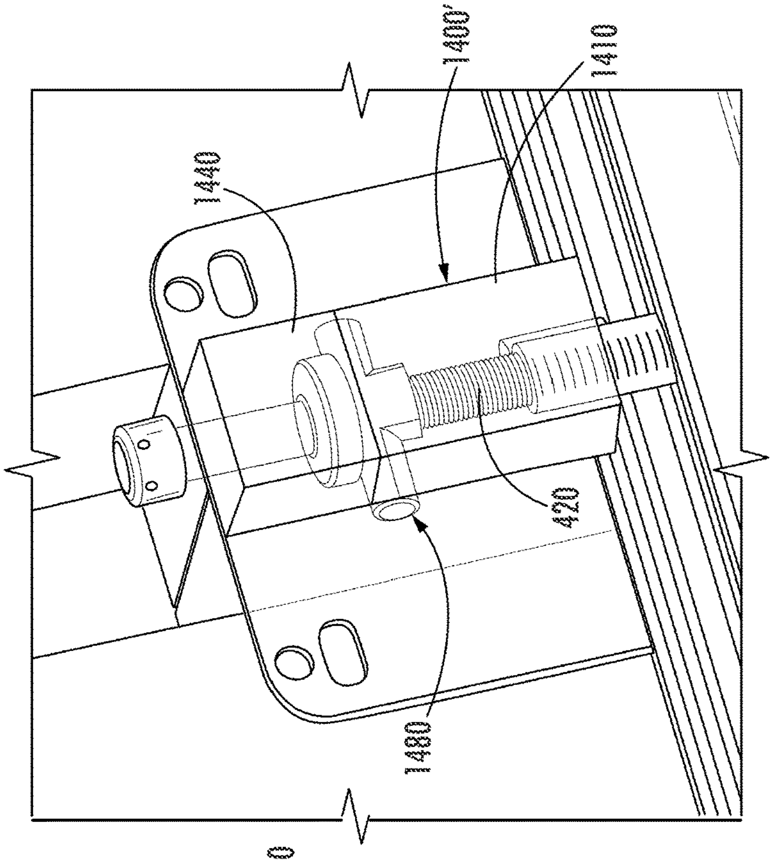
FIG. 35 is a perspective view of an exemplary bottom pivot assembly of a sliding hinge provided in accordance with the present disclosure.

Referring now to FIGS. 25 and 26, a continuous hinge 1100 is provided in accordance with an exemplary embodiment of the present disclosure. The continuous hinge 1100 includes a first leaf 1110, a second leaf 1210, a top pivot assembly 1300, and a bottom pivot assembly 1400' (FIG. 35). Components of the bottom pivot assembly 1400' are similar to the top pivot assembly 1300 with components flipped about a central lateral axis of the continuous hinge 1100 with like elements represented with a similar label with a leading "14" replacing the leading "13" of the similar element of the top pivot assembly 1300.

The continuous hinge 1100 is secured between adjacent panels 40 to support the panels 40 and facilitate movement of the panels 40 between the fully open and fully closed positions in a manner similar to the continuous hinge 100 detailed above. The continuous hinge 1100 extends continuously along a majority of a height of the panels 40 with an uppermost end of the continuous hinge 1100 adjacent a top surface of the panels 40 and a lowermost end of the continuous hinge 1100 adjacent a bottom end of the panels 40. As noted above with respect to the continuous hinge 100, the continuous hinge 1100 may be a locking hinge or a sliding hinge based on a position of the continuous hinge 1100 within a door panel assembly 10 (FIG. 1). In addition, a pivot axis of the continuous hinge 1100 may be on an exterior side of the panels 40 or an interior side of the panels 40 depending on the location of the hinge 1100 within a door assembly, e.g., door assembly 10.

The continuous hinge 1100 includes a first leaf 1110 that is secured to a side edge 42*a* that extends between in interior surface 44 and the exterior surface 48 of one panel, e.g., secondary panel 40*a*, and a second leaf 1210 that is secured to a side edge 42*b* of an adjacent panel, e.g., another secondary panel 40*b*. As described in greater detail below, the first and second leaves 1110, 1210 are pivotally coupled to one another by the top and bottom pivot assemblies 1300 to form the continuous hinge 1100. The first and second leaves 1110, 1210 may each be formed of an extrusion and cut to a desired length. The first and second leaves 1110, 1210 may be formed of aluminum, steel, thermoset plastic, or other suitable material.

Figure 27:
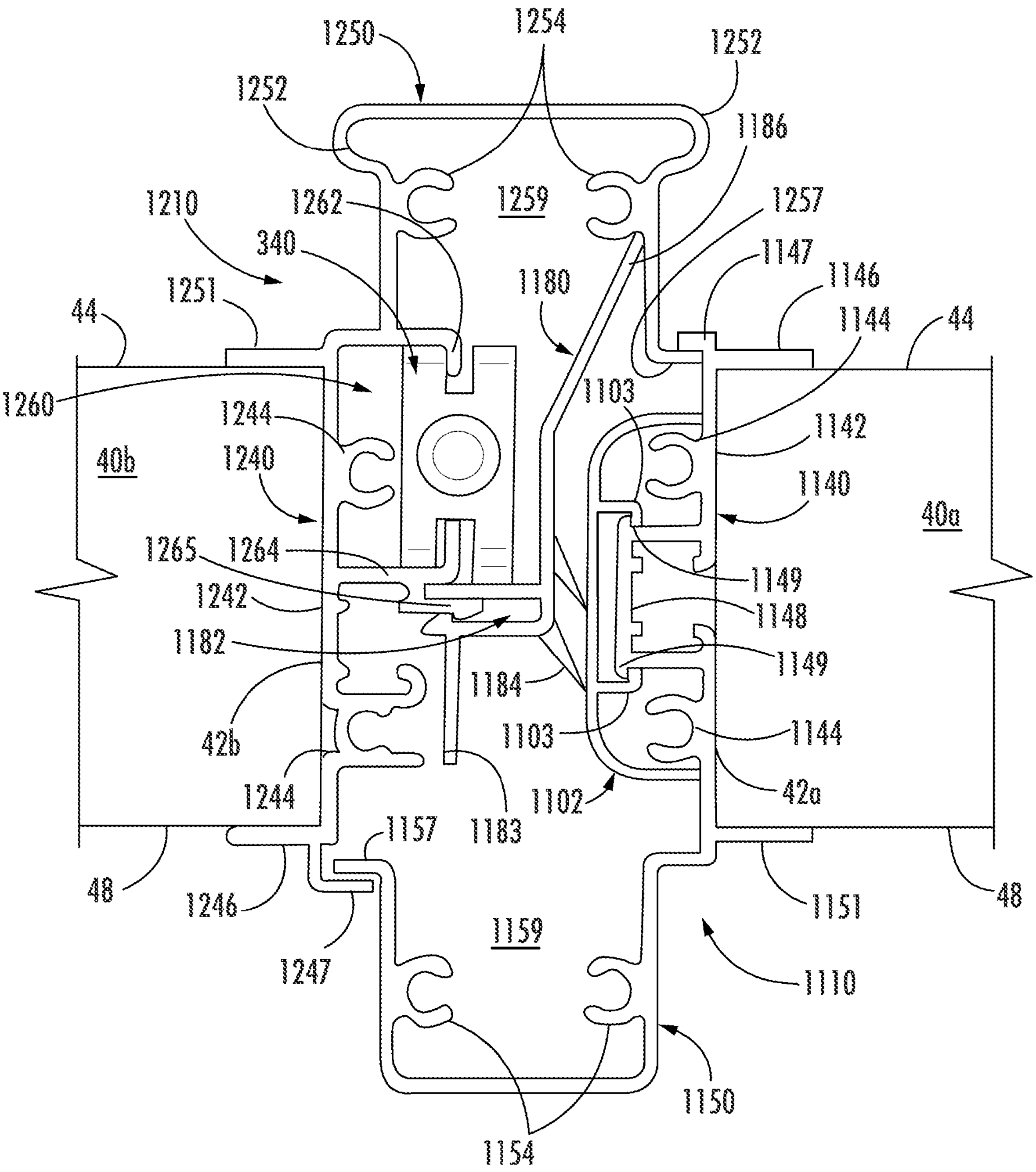
FIG. 27 is a top view of the leaves of FIG. 26.

Referring now to FIGS. 26 and 27, the first leaf 1110 includes an edge plate 1140 and a shell 1150. The edge plate 1140 includes a mounting segment 1142 and a cover mount 1148. The edge plate 1140 is secured to the side edge 42*a* of the panel 40*a* with one or more fasteners passing through the mounting segment 1142 and into the panel 40*a*. The one or more fasteners may be screws, nails, bolts, or any other suitable fastener. In some embodiments, the mounting segment 1142 is at least partially adhered to the side edge 42*a* by an adhesive. The cover mount 1148 extends in a direction parallel to and offset from the mounting segment 1142. The cover mount 1148 includes retention tabs 1149 that extend from the ends thereof to secure a cover 1102 to the first leaf 1110. The mounting segment 1142 may be continuous along the side edge 42*a* or may include a break along a portion where the cover mount 1148 connects two portions of the mounting segment 1142.

The cover 1102 includes retention fingers 1103 that engage the retention tabs 1149 to secure the cover 1102 to the first leaf 1110. The cover 1102 covers the mounting segment 1142 and the one or more fasteners that secure the first leaf 1110 to the panel 40. The cover 1102 may be designed to improve the aesthetics of the hinge 1100 when the hinge 1100 is in the open position. In the closed position of the hinge 1100, the cover 1102 may form a portion of a barrier or seal between the interior and exterior of the door panel assembly. For example, the cover 1102 may be engaged by a weather strip 1180 that forms a seal within the hinge 1100. The cover 1102 may be formed of aluminum, steel, thermoset plastic, thermoformed plastic, or other suitable material.

The edge plate 1140 also includes hinge mount receivers 1144 that are configured to receive fasteners that secure the pivot assemblies 1300, 1400 to the first leaf 1110 as detailed below. The edge plate 1140 may also include an interior alignment finger 1146 that is disposed along the interior face 44 of the panel 40*a* to align the first leaf 1110 with the panel 40*a*. The interior alignment finger 1146 may also enclose a corner of the panel 40*a* between the side edge 42*a* and the interior face 44. Enclosing the corner may improve a seal between the interior and exterior side of the panels 40 formed by the hinge 1100. The edge plate 1140 may also include a mating cover 1147 that extends towards the second leaf 1210 and may be positioned interior of the interior face 44 of the panel 40. As detailed below, the mating cover 1147 is configured to receive and cover a portion of the second leaf 1210 and form a seal with the second leaf 1210 and may act as a stop for movement towards the closed position of the hinge 1100.

The shell 1150 extends from an exterior side of the edge plate 1140 and beyond the exterior face 48 of the panel 40*a*. The shell 1150 includes an exterior alignment finger 1151 that is disposed along the exterior face 48 of the panel 40*a* to align the first leaf 1110 with the panel 40*a*. The exterior alignment finger 1151 may also enclose a corner of the panel 40*a* between the side edge 42*a* and the exterior face 48. Enclosing the corner may improve a seal between the interior and exterior side of the panels 40 formed by the hinge 1100. As shown, the exterior alignment finger 1151 is parallel to the interior alignment finger 1146 such that the panel 40*a* is sandwiched between the interior and exterior alignment fingers 1146, 1151 with the thickness of the panel 40 being disposed between the fingers 1146, 1151.

The shell 1150 extends in a direction away from the exterior face 48 of the panel 40*a* to form a cavity 1159 having a substantially rectangular cross-section. The shell 1150 also includes cover mount receivers 1154 that oppose one another. The cover mount receivers 1154 are configured to receive fasteners that secure caps or covers to the first leaf 1110 as detailed below. The shell 1150 also includes a mating finger 1157 that extends towards the second leaf 1210 and nests within a portion of the second leaf 1210 when the hinge 1100 is in a closed position thereof as shown in FIG. 27.

Continuing to refer to FIGS. 26 and 27, the second leaf 1210 includes an edge plate 1240 and a shell 1250. The edge plate 1240 includes a mounting segment 1242 that is secured to the side edge 42*b* of the panel 40*b* with one or more fasteners passing therethrough and into the panel 40*b*. In some embodiments, the mounting segment 1242 is at least partially adhered to the side edge 42*a* by an adhesive. The edge plate 1240 includes hinge mount receivers 1244 that oppose the hinge mount receivers 1144 of the first leaf 1110 when the hinge 1100 is in a closed position. The hinge mount receivers 1244 are configured to receive fasteners that secure the pivot assemblies 1300, 1400' to the second leaf 1210 as detailed below.

The edge plate 1240 may also include an exterior alignment finger 1246 that is disposed along the exterior face 48 of the panel 40*b* to align the second leaf 1210 with the panel 40*b*. The exterior alignment finger 1246 may also enclose a corner of the panel 40*b* between the side edge 42*b* and the exterior face 48. Enclosing the corner may improve a seal between the interior and exterior side of the panels 40 formed by the hinge 1100. The edge plate 1240 may also include a mating cover 1247 that extends towards the first leaf 1110 and may be positioned exterior of the exterior face 48 of the panel 40. As shown, in the closed position, the mating cover 1247 may be positioned externally of the mating finger 1157 of the first leaf 1110 such that in the closed position, the mating finger 1157 is nested within the mating cover 1247 to form a seal with the first leaf 1110 and may act as a stop for movement towards the closed position of the hinge 1100.

The shell 1250 extends from an interior side of the edge plate 1240 and beyond the interior face 44 of the panel 40*b*. The shell 1250 includes an interior alignment finger 1251 that is disposed along the interior face 44 of the panel 40*b* to align the second leaf 1210 with the panel 40*b*. The interior alignment finger 1251 may also enclose a corner of the panel 40*b* between the side edge 42*b* and the interior face 44. Enclosing the corner may improve a seal between the interior and exterior side of the panels 40 formed by the hinge 1100. As shown, the interior alignment finger 1251 is parallel to the exterior alignment finger 1246 such that the panel 40*b* is sandwiched between the interior and exterior alignment fingers 1246, 1251 with the thickness of the panel 40 being disposed between the fingers 1246, 1251.

The shell 1250 extends in a direction away from the interior face 44 of the panel 40*b* to form a cavity 1259 having a substantially rectangular cross-section. The shell 1250 may include lateral wings 1252 adjacent an internal edge of the shell 1250 that extend laterally from the edges of the shell 1250. The lateral wings 1252 form a grip that allows for a user to grip the hinge 1100. The grip formed by the lateral wings 1252 may allow a user to draw the hinge 1110 towards the closed position and/or to slide the hinge 1110 within the door assembly 10.

The shell 1250 also includes cover mount receivers 1254 that oppose one another. The cover mount receivers 1254 are configured to receive fasteners that secure the pivot assemblies 1300, 1400 to the second leaf 1210 as detailed below. The cover mount receivers 1254 may be positioned between the wings 1252 and the interior face 44 of the panel 40. The shell 1250 also includes a mating finger 1257 that extends towards the first leaf 1110 and nests within the mating cover 1147 of the first leaf 1110 when the hinge 1100 is in a closed position thereof as shown in FIG. 27.

The second leaf 1210 also includes a hollow 1260 defined adjacent the mounting segment 1240. The hollow 1260 is sized to receive a shoot bolt assembly 340 that is retained within the hollow 1260 by opposed retaining fingers 1262. The second leaf 1210 may also include a weather strip retainer 1264. The weather strip retainer 1264 may include an insert 1265 that extends away from the mounting segment 1240 and towards the first leaf 1110. The insert 1265 may be received within a channel 1182 of the weather strip 1180 to retain the weather strip 1180 within the hinge 1100.

The weather strip 1180 may include one or more sealing fins 1184 that extend towards and engage the cover 1102 when the hinge 1100 is in the closed portion. The weather strip 1180 may also include a sealing wall 1186 that extends from the channel 1182 towards the cavity 1259 of the shell 1250. The sealing wall 1186 may engage one of the cover mount receivers 1254 to secure the weather strip 1180 within the hinge 1100. Specifically, the weather strip 1180 may be fixed to the second leaf 1210 by the cooperation of the channel 1182 and the sealing wall 1186 such that the weather strip 1180 is substantially fixed relative to the second leaf 1210. The weather strip 1180 may include an extension 1183 that extends in an exterior direction from the channel 1182 in a direction parallel to the mounting segment 1242. The extension 1183 may cover portions of the second leaf 1210 when the hinge 1100 is in an open position. Covering portions of the second leaf 1210 may improve the aesthetics of the hinge 1100 when the hinge is in the open position such that the weather strip 1180 and internal portions of the hinge 1100 are visible. The second leaf 1210 may include a locking assembly, e.g., locking assembly 300 (FIG. 7), that is configured to extend and retract a shoot bolt assembly 340 as detailed above.

Figure 28:
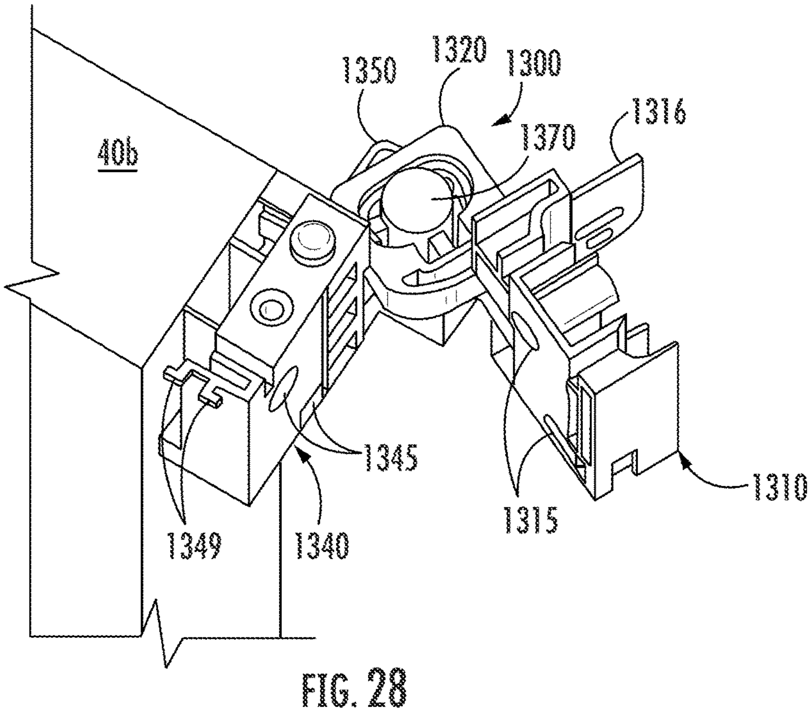
FIG. 28 is a perspective view of a top pivot assembly of the locking hinge of FIG. 25.
Figure 29:
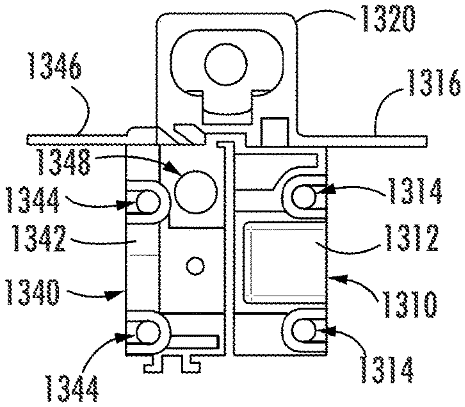
FIG. 29 is a top view of first and second sides of the top pivot assembly of FIG. 28.
Figure 30:
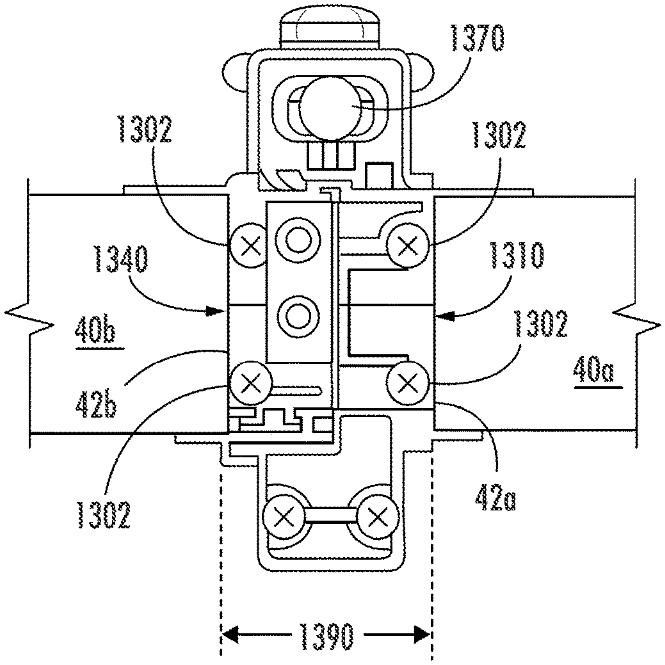
FIG. 30 is a top view of the of the locking hinge of FIG. 25 with a cover removed.

Referring to FIGS. 28-30, the top pivot assembly 1300 includes a first side 1310 and a second side 1340. The first side 1310 includes a mounting portion 1312 and a first pivot mount 1320 and the second side 1340 includes a mounting portion 1342 and a second pivot mount 1350. The mounting portions 1312, 1342 are attached to a respective one of the first and second leaves 1110, 1210 (FIG. 25) and are positioned substantially between the panels 40*a*, 40*b* when the hinge 1100 is in the closed position. Specifically, fasteners 1302 (FIG. 30) extend through fastener openings 1314, 1344 of a respective one of the first and second sides 1310, 1340 and into a respective one of the hinge mount receivers 1144, 1244 of the first or second leaves 1110, 1210. Additionally or alternatively, the mounting portions 1312, 1342 may be secured directly to a respective one of the panels 40*a*, 40*b* by a fastener (not shown) passing through a fastener opening 1315, 1345 into a respective one of the panels 40*a*, 40*b*. The mounting portions 1312, 1342 may also include alignment tabs 1316, 1346 that extend along an interior or exterior face of a respective panel 40*a*, 40*b* to position the respective first or second side 1310, 1340 relative to the panel 40*a*, 40*b*. the alignment tabs 1316, 1346 may define a fastener opening that receives a fastener that passes through the alignment tab 1316, 1346 and into the one of the panels 40*a*, 40*b* to secure the first or second side 1310, 1340 to the panel 40*a*, 40*b*.

Figure 34:
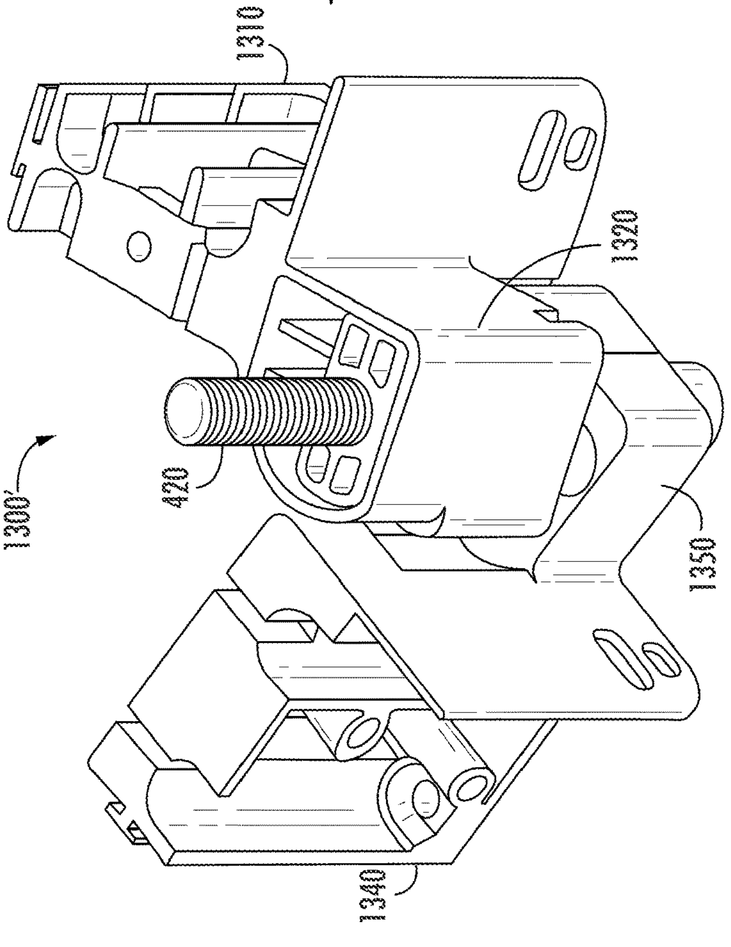
FIG. 34 is a perspective view of an exemplary top pivot assembly of a sliding hinge provided in accordance with the present disclosure.

The pivot mounts 1320, 1350 extend from the respective mounting portion 1312, 1342 and are positioned on the interior or exterior side of the panels 40*a*, 40*b* when the hinge 1100 is in the closed position depending on a direction that the hinge 1100 pivots from the closed position towards the open position. As shown, the pivot mounts 1320, 1350 extend towards the interior side of the panels 40*a*, 40*b* as the hinge 1100 is a locking hinge and moves external of the frame when moved from the closed position towards the open position. Alternatively, the pivot mounts 1320, 1350 may extend towards the exterior side of the panels 40*a*, 40*b* when the hinge 1100 is a sliding hinge and remains within the frame as the hinge moves from the closed position towards the open position as shown in FIGS. 34 and 35.

Figure 32:
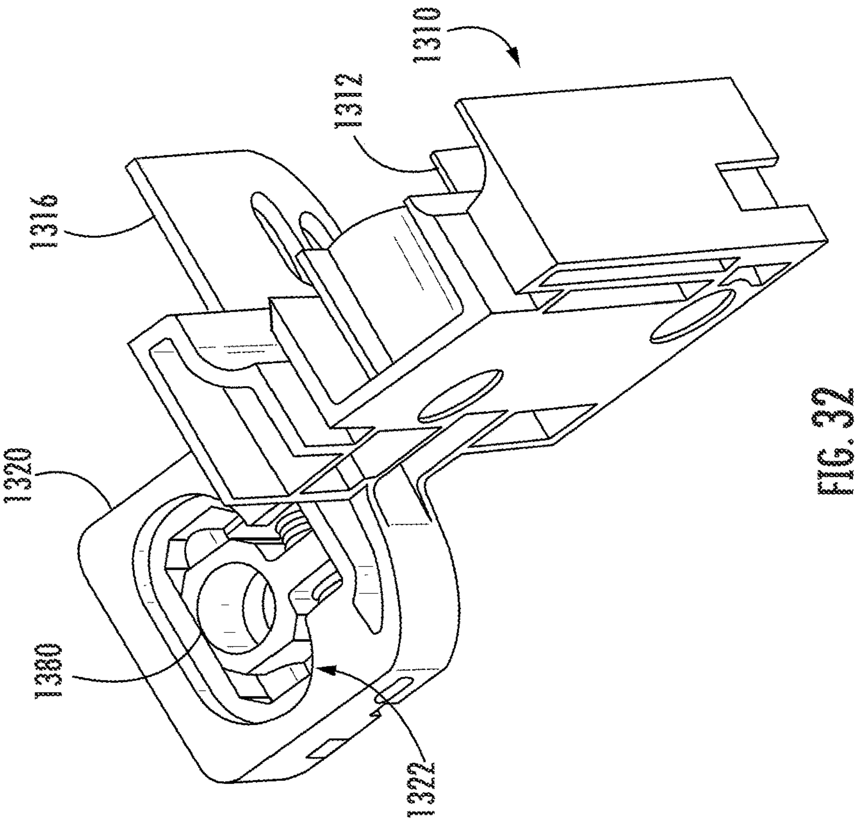
FIG. 32 is a perspective view of the first side of the top pivot assembly of FIG. 28.
Figure 31:
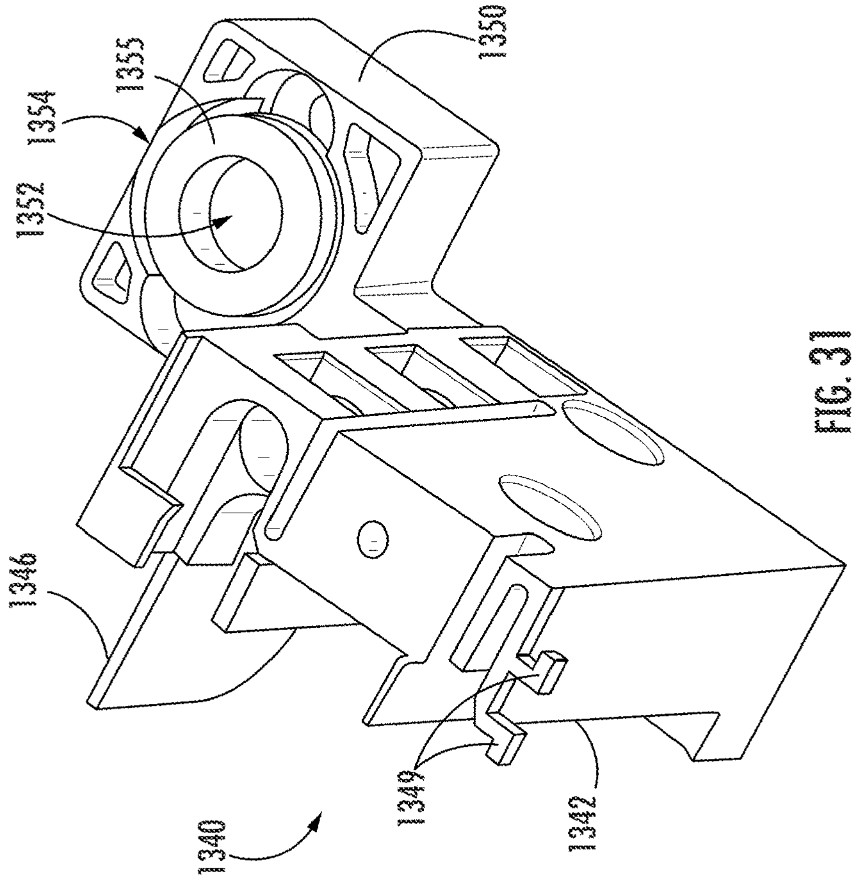
FIG. 31 is a perspective view of the second side of the top pivot assembly of FIG. 28.

With additional reference to FIGS. 31 and 32, the pivot mounts 1320, 1350 receive a pivot pin 1370 (FIG. 30) that pivotably connects the first and second sides 1310, 1340 of the top pivot assembly 1300 to one another about a pivot axis that extends along a longitudinal axis of the pivot pin 1370. The pivot mount 1350 of the second side 1340 defines a pin opening 1352 and a bearing recess 1354. The pin opening 1352 may pass entirely through the pivot mount 1350 and be sized and dimensioned to receive a shaft of the pivot pin 1370. The bearing recess 1354 is coaxially aligned with the pin opening 1352 and is dimensioned to receive a bearing 1355, e.g., a thrust bearing. The bearing 1355 is sized to compliment the pivot pin 1370 such that the second side 1310 rotates about the pivot axis defined by the pivot pin 1370. The pivot mount 1320 of the first side 1310 is disposed over, or on top of, the pivot mount 1350 of the second side 1340. The pivot mount 1320 defines an adjustment opening 1322 that is sized and dimensioned to receive a gap adjustment mechanism 1380 and the pivot pin 1370 therein.

Figure 33:
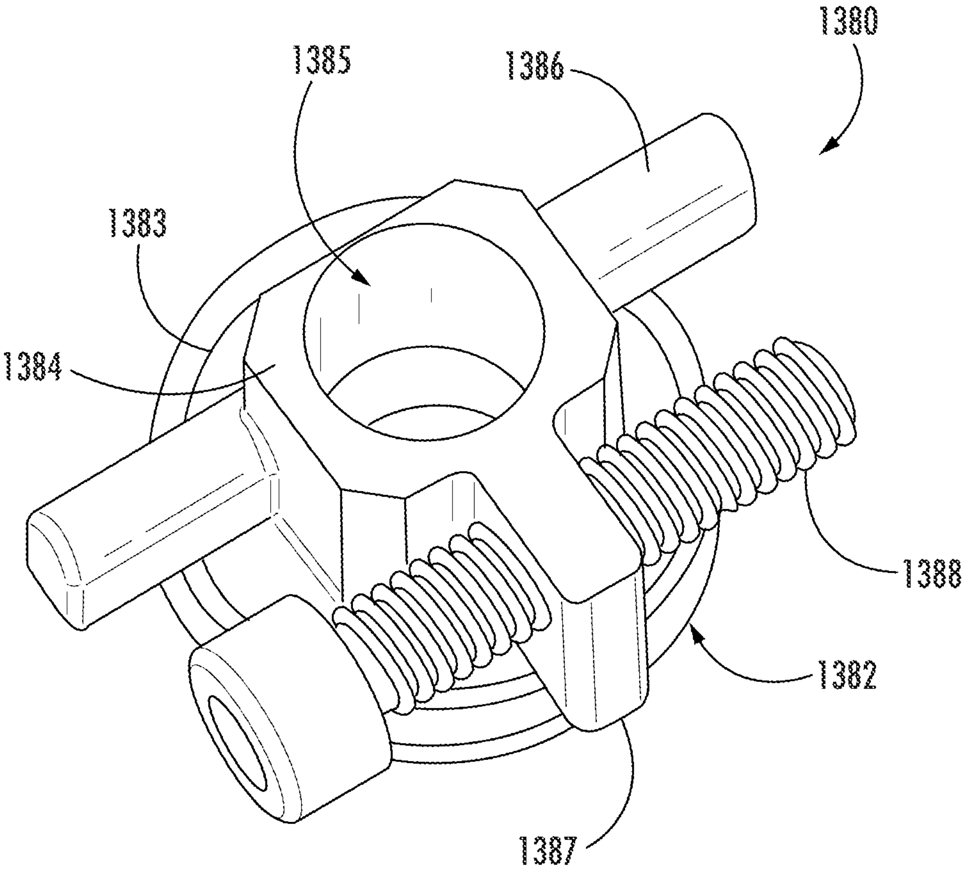
FIG. 33 is a perspective view of a gap adjustment mechanism of the top pivot assembly of FIG. 28 provided in accordance with the present disclosure.

Referring to FIG. 33, the gap adjustment mechanism 1380 includes a body 1382, a fixed pin 1386, and an adjustment screw 1388. The gap adjustment mechanism adjusts a gap 1390 (FIG. 30) between the panels 40*a*, 40*b* when the hinge 1100 is in the closed position. The gap 1390 is defined as a distance between the side edges 42*a*, 42*b* of the panels 40*a*, 40*b*. As the mounting portions 1312, 1342 of the first and second sides 1312, 1342 in the closed position of the hinge 1100 are disposed within the gap 1390, the gap 1390 can be defined as a thickness of the mounting portions 1312, 1342. The body 1382 includes a disk 1383 and a collar 1384. The disk 1383 and the collar 1384 cooperate to define a pin opening 1385 that passes through the body and is sized and dimensioned to cooperate with the pivot pin 1370 such that the first side 1310 rotates about the pivot axis defined by the pivot pin 1370. The fixed pin 1386 extends in a direction orthogonal to the pivot axis passing through the body 1382 and in a direction parallel to the thickness of the mounting portion 1312 of the first side 1310. The fixed pin 1386 is received within the adjustment opening 1322 to rotatably fix the body 1382 relative to the pivot mount 1320. The collar 1384 includes a screw tab 1387 that extends in a direction perpendicular to the longitudinal axis of the fixed pin 1386. The screw tab 1387 includes a threaded hole that receives the adjustment screw 1388 therethrough. The adjustment screw 1388 engages the mounting portion 1312 to adjust a position of the adjustment assembly 1380 within the adjustment opening 1322 such that the position of the first side 1310 relative to the second side 1312 is adjusted to adjust a size of the gap 1390. The head of the adjustment screw 1388 may be accessible when the hinge 1100 is installed to allow for adjustment after installation. The adjustment mechanism 1322 allows for a fine adjustment of the gap 1390 between the panels 40*a*, 40*b*. In addition, the adjustment mechanism 1322 may allow for a plumb adjustment of one of the panels 40*a*, 40*b*.

As shown, the first side 1310 includes the adjustment mechanism 1380; however, the adjustment mechanism 1380 may be housed in the second side 1340. Also as shown, the pivot mount 1320 of the first side 1310 is disposed over or on top of the pivot mount 1350 of the second side 1340; however, this may be reversed with the pivot mount 1350 of the second side 1340 being disposed over or on top of the pivot mount 1320 of the first side 1310. In some embodiments, the pivot mounts 1320, 1350 of the first and second sides 1310, 1340 each include a bearing without an adjustment mechanism and in other embodiments, both of the pivot mounts 1320, 1350 include an adjustment mechanism.

Referring briefly back to FIG. 25, the second side 1340 may include a shoot bolt guide plate 1360 that is secured to the top of the mounting portion 1342 thereof. The shoot bolt guide plate 1360 includes a bolt opening 1362 that is defined therethrough. The bolt opening 1362 is sized and dimensioned to allow a shoot bolt 390 to pass therethrough to guide the shoot bolt 390 into the frame 20. The shoot bolt guide plate 1360 may be secured to the mounting portion 1342 by one or more fasteners.

The hinge 1100 may include a first hinge cap 1170, a pivot cover 1180, and a second hinge cap 1270. The first hinge cap 1170 is disposed on the top end of the first leaf 1110 between the first leaf 1110 and the first side 1310 of the top pivot assembly 1300. The first hinge cap 1170 may follow the external shape of the extrusion of the first leaf 1110 such that when the first hinge cap 1170 is secured to the first leaf 1110 there are no incongruities between the first leaf 1110 and the first hinge cap 1170. The first hinge cap 1170 may be secured to the first leaf 1110 by the fasteners 1302 (FIG. 30) passing therethrough and sandwiching the first hinge cap 1170 between the first leaf 1110 and the first side 1310 of the top pivot assembly 1300. The first hinge cap 1170 may also be secured to the first leaf 1110 by fasteners passing through first hinge cap 1170 and received in the cover mount receivers 1154 of the shell 1150. The first hinge cap 1170 may substantially seal a top of the first leaf 1110 to prevent ingress of foreign material and/or water from the first leaf 1110. The first hinge cap 1170 may improve the aesthetics of the hinge 1100 by covering a portion of the pivot assembly 1300.

The pivot cap 1180 is disposed over or on top of the pivot mount 1320 of the first side 1310 of the top pivot assembly 1300 to cover the pivot mount 1320. The pivot cap 1180 may snap over the pivot mount 1320 to secure the pivot cap 1180 to the pivot mount 1320. The pivot cap 1180 may retain the pivot pin 1370 within the pivot mounts 1320, 1350. Similar to the first hinge cap 1170, the pivot cap 1180 may substantially seal a top of the pivot mount 1320 to prevent ingress of particulates and/or moisture into the pivot assembly. The pivot cap 1180 may improve the aesthetics of the hinge 1100 by configured a portion of the pivot assembly 1300.

The second hinge cap 1270 is disposed on the top end of the second leaf 1210 between the second leaf 1210 and the second side 1340 of the top pivot assembly 1300. The second hinge cap 1270 may follow the external shape of the extrusion of the second leaf 1210 such that when the second hinge cap 170 is secured to the second leaf 1210 there are no incongruities between the second leaf 1210 and the second hinge cap 1270. The second hinge cap 1270 may be secured to the second leaf 1210 by the fasteners 1302 (FIG. 30) passing therethrough and sandwiching the second hinge cap 1270 between the second leaf 1210 and the second side 1340 of the top pivot assembly 1300. The second hinge cap 1270 may define a groove 1272 that receives fingers 1349 of the second side 1340 of the pivot assembly 1300 to secure the second hinge cap 1270 to the second side 1340. The second hinge cap 1270 may substantially seal a top of the second leaf 1210 to prevent ingress of foreign material and/or water from the second leaf 1210. The second hinge cap 1270 may improve the aesthetics of the hinge 1100 by covering a portion of the pivot assembly 1300.

With reference to FIGS. 34 and 35, a top pivot assembly 1300' and a bottom pivot assembly 1400' of a sliding hinge are shown. The top pivot assembly 1300' and the bottom pivot assembly 1400' are similar to the top pivot assembly 1300 detailed above with the exception of replacing the hinge pin 1370 with a pivot shaft 420 that secures to an upper roller assembly 400 (FIG. 17) with respect to the top pivot assembly 1300' or a lower roller assembly 450 (FIG. 18) with respect to the bottom pivot assembly 1400'.

The continuous hinge assemblies detailed herein are surface mounted hinge assemblies for folding door assemblies. Specifically, the continuous hinges 100, 1100 are configured to secure or mount to unmachined hinged edges of door panels. The unmachined edges of door panels are edges that are substantially planar without requiring channels or recesses to be machined therein to receive portions of the hinges such that the unmachined hinged edges are substantially planar. The continuous hinges 100, 1100 may be referred to as surface mounted hardware for folding door assemblies or hardware for folding door assemblies that do not require machining of the panels for mounting and use. By not requiring machining of the panels, the time, and thus, the cost of installing the continuous hinges 100, 1100 may be reduced. In addition, the installation may be simplified by not requiring additional machining of door panels receiving the continuous hinges 100, 1100 as compared to traditional hinges for folding door assemblies.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A hinge assembly comprising:

a first leaf having a first mounting segment configured to secure to a first panel and extend along a majority of a hinged edge of the first panel;

a second leaf having a second mounting segment configured to secure to a second panel and extend along a majority of a hinged edge of the second panel, the first leaf and the second leaf having a closed position in which the first leaf and the second leaf are configured to align the first panel with the second panel such that an inside face of the first panel and an inside face of the second panel are coplanar with one another, the first leaf and the second leaf having an open position in which the first leaf and the second leaf are configured to position the first panel with the second panel such that the inside face of the first panel opposes the inside face of the second panel;

a top pivot assembly that is secured to a top end portion of the first leaf and a top end portion of the second leaf, the top pivot assembly defining a pivot axis such that the first leaf and the second leaf pivot relative to one another about the pivot axis between the closed position and the open position; and a top gap adjustment mechanism disposed in a first side or a second side of the top pivot assembly to adjust a distance defined between the first side and the second side of the top pivot assembly such that a top thickness defined between the first mounting segment and the second mounting segment in the closed position is adjusted.

2. The hinge assembly according to claim 1, wherein the top gap adjustment mechanism includes a top body rotatably fixed to one of the first side or the second side of the top pivot assembly, the top body defining a pivot axis of the hinge assembly and configured to receive and rotate about a top pivot pin disposed therethrough about the pivot axis.

3. The hinge assembly according to claim 2, wherein the top gap adjustment mechanism includes a top adjustment screw extending in a direction orthogonal to the pivot axis such that rotation of the top adjustment screw in a first direction increases the top thickness and rotation of the top adjustment screw in a second direction opposite the first direction decreases the top thickness.

4. The hinge assembly according to claim 3, wherein the top body is rotatably fixed to relative to one of the first side or the second side of the top pivot assembly.

5. The hinge assembly according to claim 4, wherein the top body includes a fixed pin that extends in a direction orthogonal to the pivot axis and which is parallel to the top adjustment screw, the fixed pin of the top body configured to fix the top body relative to the first side or the second side of the top pivot assembly.

6. The hinge assembly according to claim 3, wherein the top adjustment screw includes a head, the head being accessible in the closed position to allow for adjustment.

7. The hinge assembly according to claim 1, further comprising:

a bottom pivot assembly that is secured to a bottom end portion of the first leaf and a bottom end portion of the second leaf, the bottom pivot assembly defining the pivot axis such that the first leaf and the second leaf pivot relative to one another about the pivot axis between the closed position and the open position; and a bottom gap adjustment mechanism disposed in a first side or a second side of the bottom pivot assembly to adjust a distance defined between the first side and the second side of the bottom pivot assembly such that a bottom thickness defined between a first mounting segment and a second mounting segment of the bottom pivot assembly in the closed position is adjusted.

8. The hinge assembly according to claim 7, wherein the bottom gap adjustment mechanism includes a bottom adjustment screw extending in a direction orthogonal to the pivot axis such that rotation of the bottom adjustment screw in a first direction increases the bottom thickness and rotation of the bottom adjustment screw in a second direction opposite the first direction decreases the bottom thickness.

9. The hinge assembly according to claim 7, wherein the top gap adjustment mechanism and the bottom gap adjustment mechanism are adjusted such that the top thickness is equal to the bottom thickness.

10. A door panel system comprising:

a first panel having a top end portion and a bottom end portion;

a second panel having a top end portion and a bottom end portion; and a first hinge according to claim 1, the first hinge pivotally coupling the first panel to the second panel, the door panel system having a closed configuration in which the first and second panels are aligned end to end with one another and an open configuration in which the first and second panels are stacked with one another.

11. The door panel system according to claim 10, further comprising:

a third panel having a top end portion and a bottom end portion; and a second hinge according to claim 1, the second hinge pivotally coupling the second panel to the third panel, the door panel system having a closed configuration in which the first, second, and third panels are aligned end to end with one another and an open configuration in which the first, second, and third panels are stacked with one another.

12. A door panel system comprising:

a first panel having an inside face, an outside face, and a mounting edge extending between the inside face and the outside face thereof;

a second panel having an inside face, an outside face, and a mounting edge extending between the inside face and the outside face thereof; and a hinge having a first leaf secured to the mounting edge of the first panel and a second leaf secured to the mounting edge of the second panel, the hinge pivotally coupling the first panel to the second panel between a closed position in which the inside faces of the first panel and the second panel are coplanar with one another providing stackable folding doors in a multi-panel door system, and an open position in which the inside faces or the outside faces of the first panel and the second panel oppose one another, the hinge including a gap adjustment mechanism that adjusts a distance between the mounting edges of the first panel and the second panel in the closed position.

13. The door panel system according to claim 12, wherein the hinge comprises:

a top pivot secured to the first leaf and the second leaf, and a bottom pivot secured to the first leaf and the second leaf, the top pivot and the bottom pivot cooperating to a pivot axis between the first panel and the second panel.

14. The door panel system according to claim 13, wherein the gap adjustment mechanism includes a top adjustment disposed in the top pivot and a bottom adjustment disposed in the bottom pivot, the top adjustment and the bottom adjustment each configured to adjust a thickness of the hinge defined between the mounting edges of the first panel and the second panel in the closed position thereof.

15. The door panel system according to claim 14, wherein the top adjustment includes a top adjustment screw extending in a direction orthogonal to the pivot axis such that rotation of the top adjustment screw in a first direction increases the thickness between the mounting edges of the first panel and the second panel and rotation of the top adjustment screw in a second direction opposite the first direction decreases the thickness between the mounting edges of the first panel and the second panel.

16. The door panel system according to claim 15, wherein the bottom adjustment includes a bottom adjustment screw extending in a direction orthogonal to the pivot axis such that rotation of the bottom adjustment screw in a first direction increases the thickness between the mounting edges of the first panel and the second panel and rotation of the bottom adjustment screw in a second direction opposite the first direction decreases between the mounting edges of the first panel and the second panel.

17. Surface mounted hardware for a folding door assembly, the surface mounted hardware comprising:

a first leaf configured to secure to an unmachined hinged edge of a first panel of a folding door assembly;

a second leaf configured to secure to an unmachined hinged edge of a second panel of the folding door assembly, the first leaf and the second leaf having a closed position in which the first and second leaves are configured to secure the first and second panels in a coplanar relationship with one another providing stackable folding doors in a multi-panel door system, and an open position in which the first and second leaves are configured to support the first and second panels in a stacked relationship with one another in which inner faces or outer faces of the first panel and the second panel oppose one another; and a gap adjustment mechanism configured to adjust a thickness of the first leaf and the second leaf in the closed position to adjust a distance between unmachined edges of the first and second panels in the closed position.

18. The surface mounted hardware according to claim 17, wherein the gap adjustment mechanism includes a top adjustment disposed between the first leaf and the second leaf and a bottom adjustment disposed between the first leaf and the second leaf, the top adjustment, and the bottom adjustment each configured to adjust the thickness of the first leaf and the second leaf.

19. The surface mounted hardware according to claim 18, wherein the top adjustment includes a top adjustment screw extending in a direction orthogonal to a pivot axis between the first leaf and the second leaf such that rotation of the top adjustment screw in a first direction increases the thickness and rotation of the top adjustment screw in a second direction opposite the first direction decreases the thickness.

20. The door panel system according to claim 18, wherein the bottom adjustment includes a bottom adjustment screw extending in a direction orthogonal to the pivot axis between the first leaf and the second leaf such that rotation of the bottom adjustment screw in a first direction increases the thickness and rotation of the bottom adjustment screw in a second direction opposite the first direction decreases the thickness.

* * * * *